United States Patent
Qin et al.

(10) Patent No.: US 10,950,200 B2
(45) Date of Patent: Mar. 16, 2021

(54) DISPLAY METHOD AND HANDHELD ELECTRONIC DEVICE

(71) Applicant: HUAWEI TECHNOLOGIES CO., LTD., Guangdong (CN)

(72) Inventors: Chao Qin, Beijing (CN); Chiaching Chu, Shenzhen (CN); Wenmei Gao, Beijing (CN); Xiaoyan Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 16/082,998

(22) PCT Filed: Mar. 9, 2016

(86) PCT No.: PCT/CN2016/075936
§ 371 (c)(1),
(2) Date: Sep. 7, 2018

(87) PCT Pub. No.: WO2017/152386
PCT Pub. Date: Sep. 14, 2017

(65) Prior Publication Data
US 2020/0302892 A1     Sep. 24, 2020

(51) Int. Cl.
*G09G 5/10* (2006.01)
*G02F 1/1333* (2006.01)
*G02F 1/13357* (2006.01)

(52) U.S. Cl.
CPC .......... *G09G 5/10* (2013.01); *G02F 1/13338* (2013.01); *G02F 1/133308* (2013.01);
(Continued)

(58) Field of Classification Search
CPC .......... G02F 1/133308; G02F 1/13336; G02F 1/133526; G02F 1/133524; G02F 2201/56;
(Continued)

(56) References Cited

U.S. PATENT DOCUMENTS

2004/0052432 A1     3/2004   Lee et al.
2013/0271957 A1*   10/2013   Etienne ............... G02B 27/126
                                                 362/97.1
(Continued)

FOREIGN PATENT DOCUMENTS

CN       1484434 A      3/2004
CN     101483719 A      7/2009
(Continued)

OTHER PUBLICATIONS

Anonymous,"How about Sharp 305sh? Comprehensive evaluation of the parameter configuration and running score of the Sharp 305sh mobile phone (teletext)",Release time: Nov. 2014,total 27 pages with 32 pages English translation.
(Continued)

*Primary Examiner* — Dong Hui Liang
(74) *Attorney, Agent, or Firm* — Fish & Richardson P.C.

(57) ABSTRACT

The present disclosure relates to a display method. In one example method, a display is covered by a transparent panel. A location on the transparent panel and corresponding to a first area of the display has a cylindrical curved surface. An optical deformation parameter of a first area of the display is obtained. According to the optical deformation parameter of the first area, a shape of first image data is converted to obtain second image data. The first image data is image data to be displayed in the first area. The second image data is displayed in the first area.

17 Claims, 12 Drawing Sheets

(52) U.S. Cl.
CPC .......... *G02F 1/133615* (2013.01); *G02F 2001/13332* (2013.01); *G02F 2001/133607* (2013.01); *G09G 2320/062* (2013.01); *G09G 2320/068* (2013.01)

(58) Field of Classification Search
CPC .. G02F 2001/133331; G09G 2300/026; G09G 2340/0407; G09G 2310/0232; G09G 2320/0233; G09G 2320/0693
See application file for complete search history.

(56) References Cited

U.S. PATENT DOCUMENTS

| | | | |
|---|---|---|---|
| 2014/0253606 A1* | 9/2014 | Yun | G09G 3/20 345/690 |
| 2014/0375541 A1* | 12/2014 | Nister | A61B 3/113 345/156 |
| 2015/0138047 A1 | 5/2015 | Hwang et al. | |
| 2016/0245484 A1 | 8/2016 | Cao et al. | |
| 2017/0086308 A1* | 3/2017 | Large | G02F 1/133526 |
| 2017/0192291 A1 | 7/2017 | Shi | |

FOREIGN PATENT DOCUMENTS

| | | |
|---|---|---|
| CN | 102572448 A | 7/2012 |
| CN | 102917232 A | 2/2013 |
| CN | 103985084 A | 8/2014 |
| CN | 104133310 A | 11/2014 |
| CN | 104484016 A | 4/2015 |
| CN | 104515043 A | 4/2015 |
| CN | 104580741 A | 4/2015 |
| CN | 104656253 A | 5/2015 |
| CN | 105093624 A | 11/2015 |
| CN | 204808787 U | 11/2015 |

OTHER PUBLICATIONS

Zhaohui,"Why is it difficult to implement a mobile phone without a frame?",dated Jan. 8, 2015,total 5 pages with 7 pages English translation.
Anonymous,"Working principle and difference of the mobile phone display",dated Feb. 7, 2014,total 6 pages with 7 pages English translation.
Anonymous,"The Boundary Screen is really coming! Single-layer touch technology exposure",Pconline,dated Mar. 8, 2014 ,total 4 pages with 6 pages English translation.
Anonymous,"No frame mobile phone: The ID design has no edges and no visual edges. Which one is better?",dated May 2015,total 5 pages with 6 pages English translation.
Anonymous,"Nubia Z9 evaluation: There is nothing you dont know about the frame.",dated May 6, 2015,total 51 pages with 55 pages English translation.
International Search Report and Written Opinion issued in International Application No. PCT/CN2016/075936 dated Nov. 28, 2016, 22 pages.
Office Action issued in Chinese Application No. 201680080936.7 dated Dec. 25, 2019, 23 pages (with English translation).
Office Action issued in Chinese Application No. 201680080936.7 dated Aug. 17, 2020, 28 pages (with English translation).

* cited by examiner

DISPLAY METHOD AND HANDHELD ELECTRONIC DEVICE

CROSS-REFERENCE TO RELATED APPLICATIONS

This application is a national stage of International Application No. PCT/CN2016/075936, filed on Mar. 9, 2016, which is hereby incorporated by reference in its entirety.

TECHNICAL FIELD

The present invention relates to the electronic device field, and in particular, to a display method and a handheld electronic device.

BACKGROUND

As a display of an electronic device is getting larger, for a purpose of beauty, a bezel of the display of the electronic device is becoming narrower. In the prior art, an electronic device is disclosed, a display that has a planar structure is covered by a transparent panel, and an edge of the transparent panel is on an outer side of an edge of the display. The edge of the transparent panel is curved, a width of the curved edge of the transparent panel is about 1 to 2 mm, and the edge of the transparent panel is in an arc transition shape, so that by means of a refraction principle of light on different media surfaces, light emitted from the edge of the display looks like light emitted from the edge of the transparent panel, and a user cannot see the bezel. This form is occasionally called 2.5 dimensions (English full name: 2.5 Dimension, English abbreviation: 2.5D).

A disadvantage of the prior art is as follows: Because of an arc chamfer on the edge of the transparent panel, light passing through the edge of the transparent panel is refracted, an image that is normally displayed on the edge of the transparent panel is non-linearly distorted and a color of the image is distorted, and such a visual effect degrades user experience.

SUMMARY

Embodiments of the present invention provide a display method and a handheld electronic device, so that non-linear image distortion can be avoided.

A first aspect of the embodiments of the present invention provides a display method, including:
 determining, as a first area of a display, any side face of a transparent panel that covers the display, where a location in the first area of the display is corresponding to that in a deformation area of the transparent panel, the deformation area of the transparent panel has a cylindrical curved surface, and when an electronic device is levelly placed, there is an included angle between the deformation area of the transparent panel and a horizontal plane;
 obtaining an optical deformation parameter of the first area of the display;
 obtaining first image data displayed by the display, where the first image data is image data displayed in the first area of the display, that is, the first image data is displayed in the first area of the display;
 performing shrink processing on the first image data according to the optical deformation parameter of the first area, so as to obtain second image data; and
 displaying the second image data in the first area, so that linear image distortion does not appear after the second image data is refracted by the first area.

If an electronic device in the prior art is used, because a deformation area of a transparent panel is curved, an image that is normally displayed in the deformation area of the transparent panel is non-linearly distorted. However, in the method shown in this embodiment, shrink processing is first performed on image data to be displayed in the first area to form second image data, and when the shrunk second image data is refracted by the deformation area of the transparent panel, linear image distortion does not appear in the deformation area of the transparent panel.

The display that has a planar structure is covered by the transparent panel, an area of the display is less than an area of the transparent panel, and a deformation area on an edge of the transparent panel is on an outer side of an edge of the display.

If the display method shown in this embodiment is not used, an image displayed in the deformation area of the transparent panel is deformed because an optical deformation parameter of the deformation area of the transparent panel is greater than 1. It may be learned that, if the display method shown in this embodiment is not used, an image displayed only in a non-deformation area of the transparent panel is not deformed.

However, in the display method shown in this embodiment, the image displayed in the deformation area of the transparent panel is not deformed, so that no image displayed in the deformation area and the non-deformation area of the transparent panel is deformed.

It may be learned that, a width of a non-deformed image displayed by using the display method shown in this embodiment is greater than a width of the non-deformed image displayed without using the display method shown in this embodiment, so that the width of the non-deformed image can be effectively improved in the display method shown in this embodiment, thereby improving visual experience of a user in a process of using the electronic device, and improving appearance of the electronic device.

With reference to the first aspect of the embodiments of the present invention, in a first implementation of the first aspect of the embodiments of the present invention,
 a length of the first image data is compressed in a change direction of the optical deformation parameter of the first area according to the optical deformation parameter, so as to obtain the second image data.

With reference to the first implementation of the first aspect of the embodiments of the present invention, in a second implementation of the first aspect of the embodiments of the present invention,
 the first image data is divided into at least two subareas in the change direction of the optical deformation parameter of the first area;
 quantities of pixels in subareas in the first image data progressively decrease in a direction of approaching a middle position of the display;
 areas obtained by mapping the at least two subareas onto the second image data have an equal width, and the width is a length in the change direction of the optical deformation parameter of the first area;
 a weight of a pixel in each subarea is determined;
 a pixel that is completely in any subarea has a weight of 1, a weight of a pixel that is partially in any subarea is a ratio of a part that is of the pixel and that is in the subarea to a width of the pixel, and the ratio is less than 1;

pixels in each subarea are combined according to weights of adjacent pixels, so as to obtain an RGB color value of a pixel; and RGB color values of pixels that are obtained according to the pixels in each subarea are combined, so as to obtain the second image data.

In this manner of obtaining the second image data by using the first image data, the obtained second image data may be clearly and smoothly displayed, thereby effectively ensuring a display effect of the transparent panel of the electronic device.

With reference to the first implementation of the first aspect of the embodiments of the present invention, in a third implementation of the first aspect of the embodiments of the present invention, the first image data is divided into at least two subareas in the change direction of the optical deformation parameter of the first area;

areas obtained by mapping the at least two subareas onto the second image data have an equal width, and the width is a length in the change direction of the optical deformation parameter of the first area;

a pixel that has a highest weight is determined from each subarea;

if pixels in a subarea of the first image data have a same weight value, a pixel is randomly selected from the pixels that have the same weight value; or in the change direction of the optical deformation parameter of the first area, a pixel at a middle position of the subarea is selected from the pixels that have the same weight value; and pixels that have highest weights in their respective subareas are combined, so as to obtain the second image data.

In this manner of obtaining the second image data by using the first image data, only one pixel in the subarea of the first image data is selected for combination, so as to obtain the second image data, and therefore, calculation is effectively reduced, and a delay in a process of converting a shape of the first image data to obtain the second image data is effectively reduced, thereby improving use experience of the user.

With reference to the first implementation of the first aspect of the embodiments of the present invention, in a fourth implementation of the first aspect of the embodiments of the present invention, the first image data is divided into at least two subareas in the change direction of the optical deformation parameter of the first area;

the at least two subareas have an equal width, areas obtained by mapping the at least two subareas onto the second image data have unequal widths, the widths of the areas obtained by mapping the subareas onto the second image data progressively increase in a direction of approaching a second area of the display, the second area of the display is an area whose optical deformation parameter is 1, and the width is a length in the change direction of the optical deformation parameter of the first area; and pixels in each subarea in the at least two subareas are combined according to weights of adjacent pixels, so as to obtain the second image data.

In the first to the fourth implementations of the first aspect of the embodiments of the present invention, deformation of an image displayed on the edge of the display can be effectively avoided, and the image may be clearly and smoothly displayed on the transparent panel, thereby effectively ensuring the display effect of the transparent panel of the electronic device.

With reference to the method according to any one of the first aspect of the embodiments of the present invention to the fourth implementation of the first aspect of the embodiments of the present invention, in a fifth implementation of the first aspect of the embodiments of the present invention, the first area is compensated for luminance.

With reference to the fifth implementation of the first aspect of the embodiments of the present invention, in a sixth implementation of the first aspect of the embodiments of the present invention, an RGB color value of each pixel in the second image data is determined;

the RGB color value of each pixel in the second image data is converted into luminance channel data of each pixel in the second image data; and for a specific conversion manner, refer to the following conversion matrix:

$$\begin{bmatrix} Y \\ Cr \\ Cb \end{bmatrix} = \begin{bmatrix} 0.257 & 0.504 & 0.098 \\ -0.148 & -0.291 & 0.439 \\ 0.439 & -0.368 & -0.071 \end{bmatrix} \times \left( \begin{bmatrix} R \\ G \\ B \end{bmatrix} + \begin{bmatrix} 16 \\ 128 \\ 128 \end{bmatrix} \right);$$

the RGB color value of each pixel in the second image data can be converted into YCrCb color space by using the conversion matrix;

a Y value is the luminance channel data of the second image data;

proportional conversion is implemented by multiplying the luminance channel data of each pixel in the second image data by a corresponding proportionality coefficient;

proportionality coefficients progressively decrease in the direction of approaching the middle position of the display;

the luminance channel data of each pixel in the second image data is multiplied by the corresponding proportionality coefficient, so that a luminance value of the pixel in the second image data proportionally increases;

Y'CrCb color space is obtained according to proportionally converted luminance channel data Y' of the second image data, and the Y'CrCb color space is converted into an RGB color value according to the following conversion matrix:

$$\begin{bmatrix} R \\ G \\ B \end{bmatrix} = \begin{bmatrix} 1 & -0.001 & 1.402 \\ 1 & -0.3441 & -0.7141 \\ 1 & 1.772 & 0.001 \end{bmatrix} \times \left( \begin{bmatrix} Y' \\ Cr \\ Cb \end{bmatrix} - \begin{bmatrix} 16 \\ 128 \\ 128 \end{bmatrix} \right)$$

the new RGB color value may be obtained by using the conversion matrix; and the new RGB color value is restored to the second image data.

If the display method shown in this embodiment is not used, the first area of the display has an amplification effect on a pixel, luminance of the pixel displayed in the first area of the display is scattered, and the user visually perceives that luminance of an image displayed in the first area decreases. However, in the display method shown in this embodiment, not only an image displayed on the edge of the transparent panel is not deformed, but also a pixel to be displayed in the first area may be compensated for luminance, so that the first area of the transparent panel can display the pixel that is compensated for luminance and the luminance of the pixel displayed in the first area is not scattered, so as to avoid a disadvantage that the user visually perceives that the luminance of the image displayed in the first area decreases, and effectively improve definition of the image displayed on the transparent panel.

With reference to the sixth implementation of the first aspect of the embodiments of the present invention, in a seventh implementation of the first aspect of the embodiments of the present invention, an image to be displayed by the display is decomposed into three primary-color images, that is, decomposed into three pieces of first image data of different primary colors: one piece of first image data including only the red color, one piece of first image data including only the blue color, and one piece of first image data including only the green color;

lengths of the three pieces of first image data including different colors are separately compressed according to the optical deformation parameter;

the first image data including the red color is converted into first monochromatic channel data of combined image data;

the first image data including the blue color is converted into second monochromatic channel data of the combined image data;

the first image data including the green color is converted into third monochromatic channel data of the combined image data;

the first monochromatic channel data, the second monochromatic channel data, and the third monochromatic channel data are combined, so as to form the combined image data;

the combined image data is overlaid to form a color image displayed on the display; and the combined image data is displayed in the first area.

It may be learned that, in the display method shown in this embodiment, a location shift and a dispersion phenomenon of the image refracted by the transparent panel can be effectively avoided, so that a true color of the image data displayed by the display can be restored in this embodiment, and a display effect and definition of the image displayed on the transparent panel are effectively improved.

With reference to the seventh implementation of the first aspect of the embodiments of the present invention, in an eighth implementation of the first aspect of the embodiments of the present invention, a relative angle between a human face and the display is detected by using a front-facing camera of the electronic device;

the relative angle between the human face and the display may be determined according to a human face image captured by the front-facing camera;

when there is a different relative angle between the human face and the display, the first area of the display has a different width; and multiple angle intervals are preset, and a one-to-one correspondence between each angle space and an optical deformation parameter is established, where when the relative angle between the human face and the display is determined, an angle interval to which the relative angle between the human face and the display belongs is determined, and an optical deformation parameter corresponding to the angle space may be further determined.

In the display method shown in this embodiment, a different optical deformation parameter of the first area of the display can be determined according to a different relative angle between the human face and the display, and the length of the first image data is further compressed according to the optical deformation parameter of the first area of the display, so as to obtain the second image data. It may be learned that, in the method shown in this embodiment, the optical deformation parameter can be correspondingly modified according to the different relative angle between the human face and the display, so that clearness and smoothness of the image displayed on the transparent panel can still be effectively ensured when the relative angle between the human face and the display changes in a use process of the user, thereby effectively ensuring a display effect of the transparent panel of the electronic device.

With reference to the eighth implementation of the first aspect of the embodiments of the present invention, in a ninth implementation of the first aspect of the embodiments of the present invention, the optical deformation parameter is a ratio of a width of a pixel set displayed by the display to a width of a to-be-displayed pixel set, the pixel set includes at least one pixel, and the pixel set is at any location in the first area; and the first area is an area that is on the display and whose optical deformation parameter is greater than 1.

A second aspect of the embodiments of the present invention provides a handheld electronic device, including a processor and a display, where a surface of the display is covered by a transparent panel;

a deformation area of the transparent panel has a cylindrical curved surface, and an area that is on the display and that is corresponding to the deformation area of the transparent panel is a first area of the display;

when the electronic device is levelly placed, there is an included angle between the deformation area of the transparent panel and a horizontal plane; and the processor is configured to:

obtain an optical deformation parameter of the first area of the display;

obtain first image data to be displayed on the display, where the first image data is image data to be displayed in the first area of the display;

perform shrink processing on the first image data according to the optical deformation parameter of the first area, so as to obtain second image data; and display the second image data in the first area of the display, so that linear image distortion does not appear after the second image data is refracted by the first area.

If an electronic device in the prior art is used, because an edge of a transparent panel is curved, an image that is normally displayed on the edge of the transparent panel is non-linearly distorted. However, in the method shown in this embodiment, shrink processing is first performed on the image data to be displayed in the first area to form the second image data, and when the shrunk second image data is refracted by the edge of the transparent panel, linear image distortion does not appear on the edge of the transparent panel.

If the display method shown in this embodiment is not used, an image displayed on the edge of the transparent panel is deformed because an optical deformation parameter of the edge of the transparent panel is greater than 1, and an effective width of the image is a width of the display. However, in the display method shown in this embodiment, the image displayed on the edge of the transparent panel is not deformed, and the effective width of the image is a width of the transparent panel rather than the width of the display. It may be learned that, in the display method shown in this embodiment, the effective width of the image displayed by electronic device can be effectively increased, thereby improving visual experience of a user in a process of using the electronic device, and improving appearance of the electronic device.

With reference to the second aspect of the embodiments of the present invention, in a first implementation of the second aspect of the embodiments of the present invention, the processor is further configured to:
compress a length of the first image data in a change direction of the optical deformation parameter of the first area according to the optical deformation parameter, so as to obtain the second image data.

With reference to the first implementation of the second aspect of the embodiments of the present invention, in a second implementation of the second aspect of the embodiments of the present invention,
the processor is further configured to:
divide the first image data into at least two subareas in the change direction of the optical deformation parameter of the first area, where
quantities of pixels in subareas in the first image data progressively decrease in a direction of approaching a middle position of the transparent panel; and
areas obtained by mapping the at least two subareas onto the second image data have an equal width, and the width is a length in the change direction of the optical deformation parameter of the first area;
determine a weight of a pixel in each subarea, where a pixel that is completely in any subarea has a weight of 1, a weight of a pixel that is partially in any subarea is a ratio of a part that is of the pixel and that is in the subarea to a width of the pixel, and the ratio is less than 1;
combine pixels in each subarea according to weights of adjacent pixels, so as to obtain an RGB color value of a pixel; and
combine RGB color values of pixels that are obtained according to the pixels in each subarea, so as to obtain the second image data.

In this manner of obtaining the second image data by using the first image data, the obtained second image data may be clearly and smoothly displayed, thereby effectively ensuring a display effect of the electronic device.

With reference to the first implementation of the second aspect of the embodiments of the present invention, in a third implementation of the second aspect of the embodiments of the present invention,
the processor is further configured to:
divide the first image data into at least two subareas in the change direction of the optical deformation parameter of the first area, where
areas obtained by mapping the at least two subareas onto the second image data have an equal width, and the width is a length in the change direction of the optical deformation parameter of the first area;
determine a pixel that has a highest weight from each subarea;
if pixels in a subarea of the first image data have a same weight value, randomly select a pixel from the pixels that have the same weight value; or in the change direction of the optical deformation parameter of the first area, select a pixel at a middle position of the subarea from the pixels that have the same weight value; and
combine pixels that have highest weights in their respective subareas, so as to obtain the second image data.

In this manner of obtaining the second image data by using the first image data, only one pixel in the subarea of the first image data is selected for combination, so as to obtain the second image data, and therefore, calculation is effectively reduced, and a delay in a process of converting a shape of the first image data to obtain the second image data is effectively reduced, thereby improving use experience of the user.

With reference to the first implementation of the second aspect of the embodiments of the present invention, in a fourth implementation of the second aspect of the embodiments of the present invention,
the processor is further configured to:
divide the first image data into at least two subareas in the change direction of the optical deformation parameter of the first area, where
the at least two subareas have an equal width, areas obtained by mapping the at least two subareas onto the second image data have unequal widths, the widths of the areas obtained by mapping the subareas onto the second image data progressively increase in a direction of approaching a second area of the display, the second area of the display is an area whose optical deformation parameter is 1, and the width is a length in the change direction of the optical deformation parameter of the first area; and combine pixels in each subarea in the at least two subareas according to weights of adjacent pixels, so as to obtain the second image data.

In the first to the fourth implementations of the first aspect of the embodiments of the present invention, deformation of the image displayed on the edge of the transparent panel can be effectively avoided, and the image may be clearly and smoothly displayed on the transparent panel, thereby effectively ensuring the display effect of the electronic device.

With reference to the electronic device according to any one of the second aspect of the embodiments of the present invention to the fourth implementation of the second aspect of the embodiments of the present invention, in a fifth implementation of the second aspect of the embodiments of the present invention,
the processor is further configured to compensate the first area for luminance.

With reference to the fifth implementation of the second aspect of the embodiments of the present invention, in a sixth implementation of the second aspect of the embodiments of the present invention,
the processor is further configured to determine an RGB color value of each pixel in the second image data;
the RGB color value of each pixel in the second image data is converted into luminance channel data of each pixel in the second image data; and for a specific conversion manner, refer to the following conversion matrix:

$$\begin{bmatrix} Y \\ Cr \\ Cb \end{bmatrix} = \begin{bmatrix} 0.257 & 0.504 & 0.098 \\ -0.148 & -0.291 & 0.439 \\ 0.439 & -0.368 & -0.071 \end{bmatrix} \times \left( \begin{bmatrix} R \\ G \\ B \end{bmatrix} + \begin{bmatrix} 16 \\ 128 \\ 128 \end{bmatrix} \right);$$

the RGB color value of each pixel in the second image data can be converted into YCrCb color space by using the conversion matrix;

a Y value is the luminance channel data of the second image data;

proportional conversion is implemented by multiplying the luminance channel data of each pixel in the second image data by a corresponding proportionality coefficient;

proportionality coefficients progressively decrease in the direction of approaching the middle position of the transparent panel;

the luminance channel data of each pixel in the second image data is multiplied by the corresponding proportionality coefficient, so that a luminance value of the pixel in the second image data proportionally increases;

Y'CrCb color space is obtained according to proportionally converted luminance channel data Y' of the second image data, and the Y'CrCb color space is converted into an RGB color value according to the following conversion matrix:

$$\begin{bmatrix} R \\ G \\ B \end{bmatrix} = \begin{bmatrix} 1 & -0.001 & 1.402 \\ 1 & -0.3441 & -0.7141 \\ 1 & 1.772 & 0.001 \end{bmatrix} \times \left( \begin{bmatrix} Y' \\ Cr \\ Cb \end{bmatrix} - \begin{bmatrix} 16 \\ 128 \\ 128 \end{bmatrix} \right);$$

the new RGB color value may be obtained by using the conversion matrix; and the new RGB color value is restored to the second image data.

If the display method shown in this embodiment is not used, the first area of the transparent panel has an amplification effect on a pixel, luminance of the pixel displayed in the first area of the transparent panel is scattered, and the user visually perceives that luminance of an image displayed in the first area decreases. However, in the display method shown in this embodiment, not only an image displayed on the edge of the transparent panel is not deformed, but also a pixel to be displayed in the first area may be compensated for luminance, so that the first area of the transparent panel can display the pixel that is compensated for luminance and the luminance of the pixel displayed in the first area is not scattered, so as to avoid a disadvantage that the user visually perceives that the luminance of the image displayed in the first area decreases, and effectively improve definition of the image displayed on the transparent panel.

With reference to the fifth implementation of the second aspect of the embodiments of the present invention, in a seventh implementation of the second aspect of the embodiments of the present invention, the handheld electronic device further includes a backlight module, and the backlight module is disposed at a location corresponding to the first area; and the processor is configured to compensate the first area for luminance according to the optical deformation parameter by using the backlight module.

A pixel to be displayed in the first area is compensated for luminance, so that the first area of the display can display the pixel that is compensated for luminance and the luminance of the pixel displayed on the transparent panel is not scattered, so as to avoid a disadvantage that the user visually perceives that the luminance of the image displayed in the first area decreases, and effectively improve definition of the image displayed on the transparent panel.

With reference to the electronic device according to any one of the second aspect of the embodiments of the present invention to the seventh implementation of the second aspect of the embodiments of the present invention, in an eighth implementation of the second aspect of the embodiments of the present invention, the processor is further configured to: decompose an image to be displayed by the display into three primary-color images, that is, into three pieces of first image data of different primary colors: one piece of first image data including only the red color, one piece of first image data including only the blue color, and one piece of first image data including only the green color;

separately compress lengths of the three pieces of first image data including different colors according to the optical deformation parameter;

convert the first image data including the red color into first monochromatic channel data of combined image data;

convert the first image data including the blue color into second monochromatic channel data of the combined image data;

convert the first image data including the green color into third monochromatic channel data of the combined image data;

combine the first monochromatic channel data, the second monochromatic channel data, and the third monochromatic channel data, so as to form the combined image data; and overlay the combined image data to form a color image displayed on the display, where the display is configured to display the combined image data in the first area.

It may be learned that, in the display method shown in this embodiment, a location shift and a dispersion phenomenon of the image refracted by the transparent panel can be effectively avoided, so that a true color of the image data displayed by the display can be restored in this embodiment, and a display effect and definition of the image displayed on the transparent panel are effectively improved.

With reference to the electronic device according to any one of the second aspect of the embodiments of the present invention to the eighth implementation of the second aspect of the embodiments of the present invention, in a ninth implementation of the second aspect of the embodiments of the present invention, the handheld electronic device further includes a front-facing camera, and the front-facing camera is configured to obtain a human face image; and when there is a different relative angle between a human face and the display, the first area of the display has a different width; and the processor is further configured to:

preset multiple angle intervals, and establish a one-to-one correspondence between each angle space and an optical deformation parameter, where when the relative angle between the human face and the display is determined, an angle interval to which the relative angle between the human face and the display belongs is determined, and an optical deformation parameter corresponding to the angle space may be further determined.

In the display method shown in this embodiment, a different optical deformation parameter of the first area of the display can be determined according to a different relative angle between the human face and the display, and the length of the first image data is further compressed according to the optical deformation parameter of the first area of the display, so as to obtain the second image data. It may be learned that, in the method shown in this embodiment, the optical deformation parameter can be correspondingly modified according to the different relative angle between the human face and the display, so that clearness and smoothness of the image displayed on the transparent panel can still be effectively ensured when the relative angle between the human face and the display changes in a use process of the user, thereby effectively ensuring a display effect of the transparent panel of the electronic device.

With reference to the electronic device according to any one of the second aspect of the embodiments of the present invention to the ninth implementation of the second aspect of the embodiments of the present invention, in a tenth implementation of the second aspect of the embodiments of the present invention, the optical deformation parameter is a ratio of a width of a pixel set displayed by the display to a width of a to-be-displayed pixel set, the pixel set includes at least one pixel, and the pixel set is at any location in the first area; and the first area is an area that is on the display and whose optical deformation parameter is greater than 1.

A third aspect of the embodiments of the present invention provides a handheld electronic device, including a display;

the display includes a first area;

a surface of the display is covered by a transparent panel, and a part that is of the transparent panel and that covers the first area has a cylindrical curved surface; and a width that is of a pixel in the first area and that is in a change direction of an optical deformation parameter of the transparent panel is in direct proportion to the optical deformation parameter, where widths of pixels in the first area of the display are uneven.

An advantage of using the handheld electronic device shown in this embodiment is as follows: The width that is of the pixel in the first area of the display and that is in the change direction of the optical deformation parameter of the transparent panel is in direct proportion to the optical deformation parameter, so that an image displayed on an edge of the transparent panel is not deformed and no detail of the image is lost after the transparent panel refracts the pixel in the first area, and no processing process needs to be added to software, thereby ensuring no delay of image display and improving a display effect and user experience.

With reference to the third aspect of the embodiments of the present invention, in a first implementation of the third aspect of the embodiments of the present invention, the display further includes a second area, and the first area is located on at least one side of the second area; and a part that is of the transparent panel and that covers the second area has a planar structure, and pixels in the second area have an equal width in the change direction of the optical deformation parameter of the transparent panel.

The embodiments of the present invention provide the display method and the handheld electronic device. The display method includes: obtaining the optical deformation parameter of the first area of the display; converting, according to the optical deformation parameter of the first area, the shape of the first image data to obtain the second image data, where the first image data is the image data to be displayed in the first area; and displaying the second image data in the first area. In the display method shown in the embodiments, the image displayed on the edge of the transparent panel is not deformed, and the definition of the image displayed on the transparent panel is ensured, so as to improve the visual experience of the user in the process of using the electronic device, and improve the appearance of the electronic device.

DESCRIPTION OF EMBODIMENTS

Embodiment 1: This embodiment of the present invention provides a display method, so that an image on an edge of a transparent panel of an electronic device is not non-linearly distorted.

A specific structure of an electronic device to which the display method shown in this embodiment of the present invention can be applied is first described in detail with reference to FIG. 1.

Figure 1:
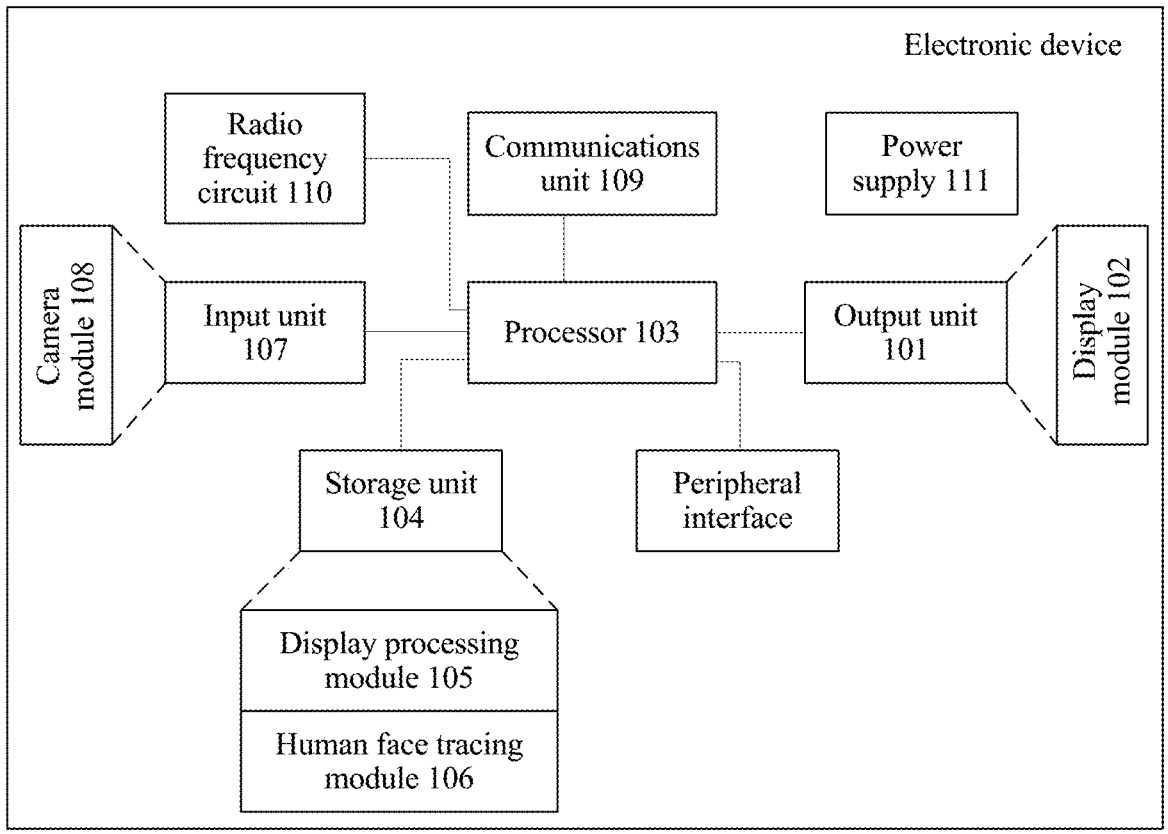
FIG. 1 is a schematic structural diagram of an electronic device according to an embodiment of the present invention.

FIG. 1 is a specific schematic structural diagram of an electronic device according to a specific embodiment of the present invention.

The electronic device includes components shown in FIG. 1, and these components communicate by using one or more buses.

A person skilled in the art may understand that a structure of the electronic device shown in FIG. 1 does not constitute a limitation on the present invention. The structure may be a bus structure, or may be a star structure, or may further include more or fewer components than those shown in the figure, or combine some components, or have different component arrangements.

In this embodiment of the present invention, the electronic device may be any mobile or portable electronic device, including but not limited to a mobile phone, a tablet personal computer (English full name: Tablet Personal Computer), a multimedia player, a personal digital assistant (English full name: personal digital assistant, English abbreviation: PDA), a navigation apparatus, a mobile Internet device (English full name: Mobile Internet Device, English abbreviation: MID), a media player, a smart TV, a combination of the foregoing two or more items, and the like.

The electronic device provided in this embodiment includes an output unit 101, a processor 103, a storage unit 104, an input unit 107, a communications unit 109, a radio frequency circuit 110, and a power supply 111.

The output unit 101 includes but is not limited to an image output unit and a sound output unit. The image output unit is configured to output text, an image, and/or a video.

The image output unit may include a display panel, for example, a display panel configured in a form of a liquid crystal display (English full name: Liquid Crystal Display, English abbreviation: LCD), an organic light-emitting diode (English full name: Organic Light-Emitting Diode, English abbreviation: OLED), a field emission display (English full name: field emission display, English abbreviation: FED), and the like.

Alternatively, the image output unit may include a reflective display, for example, an electrophoretic (English full name: electrophoretic) display, or a display using a technology of interferometric modulation of light (English full name: Interferometric Modulation of Light).

The image output unit may include a single display or multiple displays, and the multiple displays may have a same size, or may have different sizes.

In this specific embodiment of the present invention, a touch panel used by an input unit 101 may also be used as a display panel of the output unit 101.

For example, after detecting a gesture operation of touching or approaching on the touch panel, the touch panel transmits the gesture operation to a processor 103 to determine a type of a touch event. Then, the processor 103 provides corresponding visual output on the display panel according to the type of the touch event.

In FIG. 1, the input unit 107 and the output unit 101 serve as two independent parts to implement input and output functions of the electronic device. However, in some embodiments, the touch panel and the display panel may be integrated to implement the input and output functions of the electronic device.

For example, the image output unit may display various graphical user interfaces (English full name: Graphical User Interface, English abbreviation: GUI) to serve as virtual control components, including but not limited to a window, a scroll bar, an icon, and a clipboard, so that a user performs an operation in a touch manner.

In this specific embodiment of the present invention, the image output unit includes a filter and an amplifier that are configured to filter and amplify a video output by the processor. An audio output unit includes a digital-to-analog converter. The digital-to-analog converter is configured to convert an audio signal output by the processor from a digital format to an analog format.

In this embodiment of the present invention, the output unit 101 specifically includes a display module 102, the display module 102 is configured to display a to-be-displayed image on the display, and the display is covered by a transparent panel, so that light of the image can enter eyes of the user.

The processor 103 serves as a control center of the electronic device, is connected to various parts of the entire electronic device by using various interfaces and lines, and implements various functions of the electronic device and/or processes data by running or executing a software program and/or a module stored in a storage unit and invoking data stored in the storage unit 104.

The processor 103 may include an integrated circuit (English full name: Integrated Circuit, English abbreviation: IC), for example, may include a single packaged IC, or may include multiple packaged ICs that are connected and that have a same function or different functions.

For example, the processor 103 may include only a central processing unit (English full name: Central Processing Unit, English abbreviation: CPU), or may be a combination of a graphics processing unit (English full name: Graphics Processing Unit, English abbreviation: GPU), a digital signal processor 103 (English full name: Digital Signal Processor, English abbreviation: DSP), and a control chip (for example, a baseband chip) in a communications unit 109.

In this embodiment of the present invention, the processor 103 may include a single computing core, or may include multiple computing cores.

The storage unit 104 may be configured to store a software program and a module, and the processor 103 executes various functional applications of the electronic device and implements data processing by running the software program and the module that are stored in the storage unit 104.

The storage unit 104 mainly includes a program storage area and a data storage area. The program storage area may store an operating system and an application program required by at least one function, such as a sound playing program and an image playing program. The data storage area may store data (such as audio data or a phonebook) created according to use of the electronic device, and the like.

In this specific embodiment of the present invention, the storage unit 104 may include a volatile memory, such as a nonvolatile random access memory (English full name: Nonvolatile Random Access Memory, English abbreviation: NVRAM), a phase change random access memory (English full name: Phase Change RAM, English abbreviation: PRAM), or a magnetoresistive random access memory (English full name: Magetoresistive RAM, English abbreviation: MRAM), or may further include a non-volatile memory, such as at least one magnetic disk storage device, an electrically erasable programmable read-only memory (English full name: Electrically Erasable Programmable Read-Only Memory, English abbreviation: EEPROM), or a flash storage device, such as a NOR flash memory (English full name: NOR flash memory) or a NAND flash memory (English full name: NAND flash memory).

The nonvolatile memory stores an operating system and an application program that are executed by the processor

103. The processor 103 loads a running program and data from the nonvolatile memory into a memory, and stores digital content in a massive storage apparatus. The operating system includes various components and/or drivers that are configured to control and manage a routine system task, for example, memory management, storage device control, and power management, and that facilitate communication between various types of software and hardware.

In this embodiment of the present invention, the operating system may be an Android system of Google, an iOS system developed by Apple, a Windows operating system developed by Microsoft, or an embedded operating system such as VxWorks.

The application program includes any application installed on the electronic device, and includes but is not limited to a browser, an email, an instant messaging service, word processing, keyboard virtualization, a window widget, encryption, digital copyright management, voice recognition, voice duplication, positioning (such as a function provided by a global positioning system), music playing, and the like.

In this embodiment of the present invention, the storage unit 104 is configured to store code and data, the code is run by the processor 103, and the data includes at least one of an optical deformation parameter or a curvature parameter of the transparent panel, or a compression parameter or a pixel weight parameter of an image.

The input unit 107 is configured to implement interaction between the user and the electronic device and/or input of information into the electronic device.

For example, the input unit 107 may receive digit or character information entered by the user, so as to generate signal input related to user setting or function control.

In this specific embodiment of the present invention, the input unit 107 may be a touch panel, or may be another human-computer interaction interface such as a substantive input key and a microphone, or may be another apparatus for obtaining external information, for example, a camera. The touch panel, also referred to as a touchscreen, may collect an operation action of touching or approaching the touch panel by the user.

For example, the user performs an operation action on the touch panel or at a position near the touch panel by using any appropriate object or accessory such as a finger or a stylus, and a corresponding connection apparatus is driven according to a preset program.

Optionally, the touch panel may include two parts: a touch detection apparatus and a touch controller.

The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor 103.

The touch controller may further receive and execute a command sent by the processor.

In addition, the input unit 107 may implement the touch panel in multiple types, such as a resistive type, a capacitive type, an infrared (Infrared) ray type, and a surface acoustic wave type.

In another embodiment of the present invention, a substantive input key used by the input unit 107 may include but is not limited to one or more of a physical keyboard, a function key (such as a volume control key or a on/off key), a trackball, a mouse, a joystick, or the like. The input unit 107 in a form of a microphone may collect a voice that is input by the user or an environment, and convert the voice into a command that is in a form of an electrical signal and that can be executed by the processor.

In some embodiments of the present invention, the input unit 107 may be various sensing components (for example, a Hall component) configured to: detect a physical quantity of the electronic device, such as force, torque, pressure, stress, a location, displacement, a speed, an acceleration, an angle, an angular velocity, a quantity of revolutions, a rotational speed, and time at which a working status changes; and convert the physical quantity into a quantity of electricity to perform detection and control.

Some other sensing components may include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The communications unit 109 is configured to establish a communications channel, so that the electronic device is connected to a remote server by using the communications channel and downloads media data from the remote server.

The communications unit 109 may include a communications module such as a wireless local network (English full name: Wireless Local Area Network, English abbreviation: wireless LAN) module, a Bluetooth module, or a baseband module, and include a radio frequency (English full name: Radio Frequency, English abbreviation: RF) circuit corresponding to the communications module; and is configured to perform wireless local area network communication, Bluetooth communication, infrared communication, and/or communication in a cellular communications system, such as a Wideband Code Division Multiple Access (English full name: Wideband Code Division Multiple Access, English abbreviation: W-CDMA) and/or High Speed Downlink Packet Access (English full name: High Speed Downlink Packet Access, HSDPA) system, or a Long Term Evolution (English full name: Long Term Evolution, English abbreviation: LTE) system.

The communications unit 109 is configured to control communication between all the components in the electronic device, and can support direct memory access (English full name: Direct Memory Access).

In different embodiments of the present invention, each communications module in the communications unit 109 generally appears in a form of an integrated circuit chip (English full name: Integrated Circuit Chip), and may be selectively combined without a need of including all communications modules and corresponding antenna groups.

For example, the communications unit 109 may include only a baseband chip, a radio frequency chip, and a corresponding antenna, so as to provide a communication function in the cellular communications system. The electronic device may be connected to a cellular network (English full name: Cellular Network) or the Internet by means of a wireless communications connection established by the communications unit 109, for example, access the cellular network or the Internet by using a wireless local area network or WCDMA. In some optional embodiments of the present invention, the communications module in the communications unit 109, for example, the baseband module, may be integrated into the processor, typically, such as an APQ+MDM family of platforms provided by Qualcomm.

The radio frequency circuit 110 is configured to receive and send information, or receive and send a signal during a call.

For example, after receiving downlink information from a base station, the radio frequency circuit sends the downlink information to the processor 103 for processing; and sends designed uplink data to the base station. Generally, the radio frequency circuit 110 includes a known circuit used to perform these functions, and includes but is not limited to an antenna system, a radio frequency transceiver, one or more amplifiers, a tuner, one or more oscillators, a digital signal processor, a codec (Codec) chip set, a subscriber identity module (SIM) card, a memory, and the like.

In addition, the radio frequency circuit 110 may further communicate with a network and another device by means of wireless communication. The wireless communication may use any communication standard or protocol, including but not limited to a Global System for Mobile communications (English full name: Global System of Mobile communication, English abbreviation: GSM), a general packet radio service (English full name: General Packet Radio Service, English abbreviation: GPRS), Code Division Multiple Access (English full name: Code Division Multiple Access, English abbreviation: CDMA), Wideband Code Division Multiple Access (English full name: Wideband Code Division Multiple Access, English abbreviation: WCDMA), a High Speed Uplink Packet Access (English full name: High Speed Uplink Packet Access, English abbreviation: HSUPA) technology, Long Term Evolution (English full name: Long Term Evolution, English abbreviation: LTE), an email, a short message service (English full name: Short Messaging Service, English abbreviation: SMS).

The power supply 111 is configured to supply power to different components of the electronic device to maintain operation. Generally, the power supply 111 may be a built-in battery, for example, a common lithium-ion battery or a nickel-hydride battery; and may also include an external power supply that directly supplies power to the electronic device, for example, an AC adapter.

In some embodiments of the present invention, the power supply 111 may also be defined in a wider scope; for example, may further include a power management system, a charging system, a power failure detection circuit, a power converter or inverter, a power status indicator (such as a light emitting diode), and any other components related to power generation, management, and distribution of the electronic device.

It may be learned from FIG. 1 that, the display module 102 included in the output unit 101 can output a to-be-displayed image to the display apparatus, so that the display apparatus can display the image.

Figure 2:
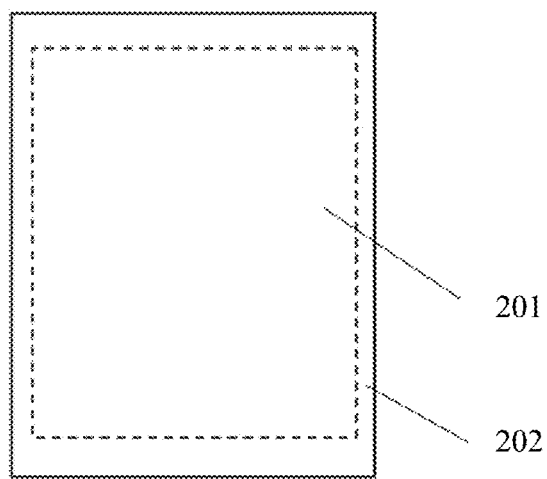
FIG. 2 is a top-view schematic structural diagram of a display apparatus according to an embodiment of the present invention.
Figure 3:
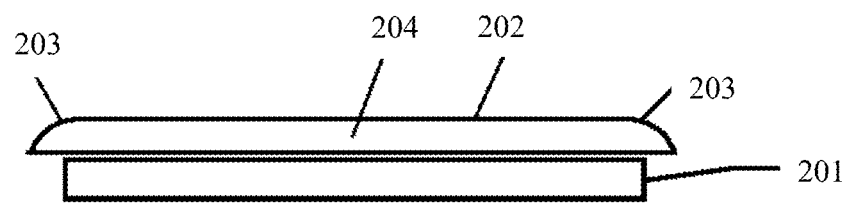
FIG. 3 is a side-view schematic structural diagram of a display apparatus according to an embodiment of the present invention.

The following describes a specific structure of the display apparatus with reference to FIG. 2 and FIG. 3.

FIG. 2 is a top-view schematic structural diagram of the display apparatus. FIG. 3 is a side-view schematic structural diagram of the display apparatus.

Specifically, the display apparatus includes a display 201 and a transparent panel 202.

This embodiment constitutes no limitation on the display 201, except that pixel density of the display 201 is required to be even.

Optionally, the display 201 may be a liquid crystal display (English full name: Liquid Crystal Display, English abbreviation: LCD), or the display 201 may be an active-matrix organic light emitting diode (English full name: Active Matrix/Organic Light Emitting Diode, English abbreviation: AMOLED).

The display 201 is covered by the transparent panel 202, and a width of the transparent panel 202 is greater than a width of the display 201.

The transparent panel 202 is a screen of the electronic device.

More specifically, the transparent panel 202 has a deformation area 203 and a non-deformation area 204.

The non-deformation area 204 of the transparent panel 202 is disposed at a location corresponding to the display 201, and the deformation area 203 is configured on at least one side of the non-deformation area 204.

The non-deformation area 204 is parallel to a surface of the display 201, and there is an included angle between the deformation area 203 and the surface of the display 201.

This embodiment uses FIG. 2 and FIG. 3 as an example, that is, deformation areas 203 are configured on two sides of the non-deformation area 204.

Certainly, the deformation area 203 may be located on any side of the non-deformation area 204, and this is not specifically limited in this embodiment. For example, the deformation area 203 may be located on a left side, a right side, an upper side, or a lower side of the non-deformation area 204.

Specifically, as shown in FIG. 3, the deformation area 203 has a cylindrical curved surface, that is, there are curved edges on two sides of the transparent panel 202.

To avoid non-linear distortion of an image displayed in the deformation area 203 of the transparent panel 202, that is, to avoid non-linear image stretching caused by the deformation area 203, based on the electronic device shown in FIG. 1 to FIG. 3, an embodiment of the present invention provides a display method.

Figure 4:
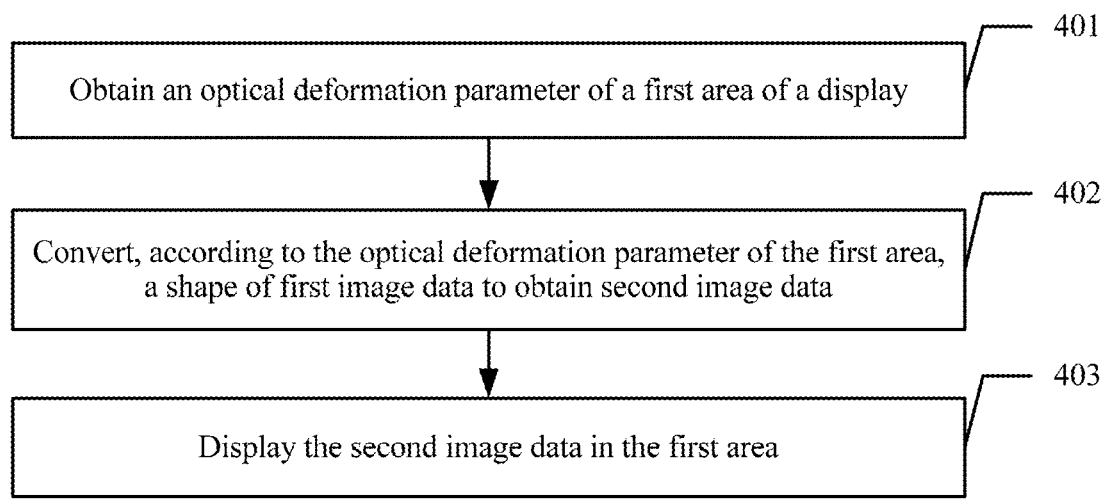
FIG. 4 is a flowchart of steps of a display method according to an embodiment of the present invention.

As shown in FIG. 4, the display method provided in this embodiment of the present invention includes the following steps.

401. Obtain an optical deformation parameter of a first area of the display.

First, the first area of the display is described.

In this embodiment, the first area of the display is an area corresponding to the deformation area 203 of the transparent panel 202.

Specifically, after image data displayed in the first area of the display is refracted by the deformation area 203, the image data displayed in the deformation area 203 is non-linearly distorted.

More specifically, before step 401 is performed, the processor 103 shown in FIG. 1 may pre-determine the optical deformation parameter of the first area of the display, and store the determined optical deformation parameter of the first area of the display in the storage unit 104 shown in FIG. 1.

In a process of performing step 401, the processor 103 may directly invoke the optical deformation parameter that is of the first area of the display and that is stored in the storage unit 104.

In this embodiment, an optical deformation parameter of the deformation area 203 is equal to the optical deformation parameter of the first area of the display.

It may be learned that, in a process in which the processor 103 stores the optical deformation parameter, the processor 103 may first determine the optical deformation parameter of the deformation area 203, and the processor 103 may further determine the optical deformation parameter of the first area that is of the display and that is corresponding to a location in the deformation area 203.

In brief, the optical deformation parameter of the first area of the display may be determined, so long as the processor 103 can determine the optical deformation parameter of the deformation area 203.

The following describes a manner in which the processor 103 determines the optical deformation parameter of the deformation area 203. It should be noted that, this embodiment describes an example of the manner of determining the optical deformation parameter of the deformation area, and constitutes no limitation thereon.

Figure 5:
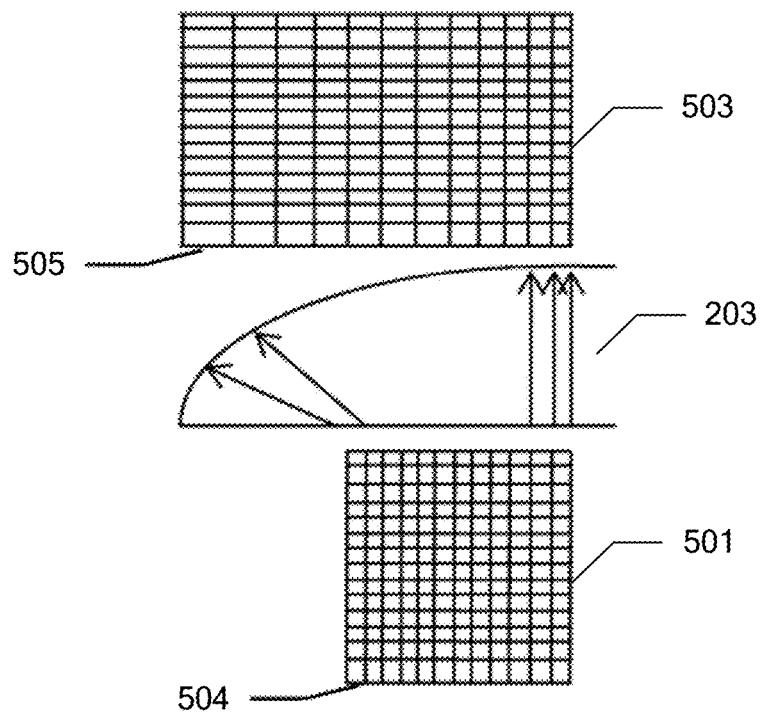
FIG. 5 is a schematic diagram of image display according to an embodiment of the present invention.

A first manner of determining the optical deformation parameter of the deformation area is as follows:

As shown in FIG. 5, after a display image 501 is refracted by the deformation area 203, an image 503 is displayed.

The display image 501 is an image displayed in the first area of the display.

Specifically, it may be learned from FIG. 5 that, the display image 501 is divided into multiple evenly distributed first pixel sets 504.

The first pixel set 504 is a to-be-displayed pixel set, and a pixel included in the first pixel set 504 needs to be refracted by the deformation area 203 before being displayed.

The display image 501 is an image corresponding to a location in the deformation area 203, that is, the display image 501 needs to be refracted by the deformation area 203 before being displayed for viewing by the user.

For specific description of the deformation area 203, refer to the description of FIG. 2 and FIG. 3. Details are not described in this embodiment.

A second pixel set 505 is formed after each first pixel set 504 is refracted by the deformation area 203, that is, the second pixel set 505 is an image formed after the first pixel set 504 passes through the first area 503.

The second pixel set 505 is a displayed pixel set, and a pixel included in the second pixel set 505 is displayed on the transparent panel 202.

The first pixel sets 504 are in a one-to-one correspondence with second pixel sets 505.

Specifically, it is assumed that a width of the first pixel set 504 is x and a width of the second pixel set 505 is y.

Because of refraction of the deformation area 203, the width x of the first pixel set 504 is less than the width y of the second pixel set 505 corresponding to the first pixel set 504, that is, a relationship between the widths of the mutually corresponding first pixel set 504 and second pixel set 505 is that y is greater than x.

The first pixel set 504 shown in this embodiment includes at least one pixel. Because the second pixel set 505 is corresponding to the first pixel set 504, a quantity of pixels included in the second pixel set 505 is equal to a quantity of pixels included in the first pixel set 504.

Different locations in the deformation area 203 have different optical deformation parameters. When an optical deformation parameter of any location in the deformation area 203 is determined, a width x of a first pixel set 504 and a width y of a second pixel set 505 that are corresponding to the location are first determined, and the optical deformation parameter of the location is y/x.

It may be learned that the optical deformation parameter of any location in the deformation area 203 may be obtained by using the method.

Further, referring to FIG. 5, it may be learned that, an included angle between an outer surface of the deformation area 203 and a horizontal plane gradually decreases in a direction of approaching the non-deformation area, and therefore, the optical deformation parameter gradually decreases.

Because the non-deformation area of the transparent panel does not have a deformation effect on the display image, an optical deformation parameter of the non-deformation area of the transparent panel is 1, and an area that is on the transparent panel and whose optical deformation parameter is greater than 1 is the deformation area 203.

Figure 6:
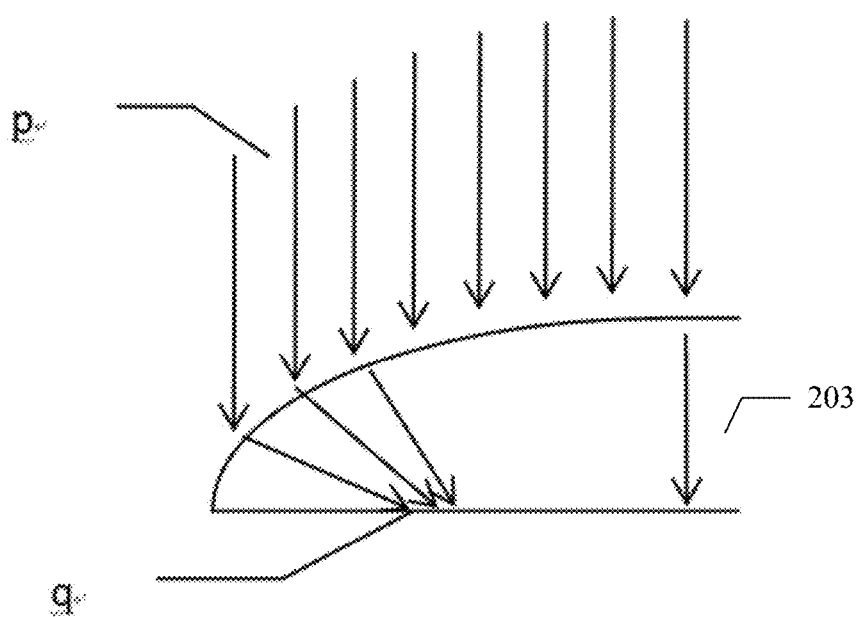
FIG. 6 is a schematic diagram of light passing through a transparent panel according to an embodiment of the present invention.

A second manner of determining the optical deformation parameter is as follows:

As shown in FIG. 6, incident rays that are incident on the outer surface of the deformation area 203 are equally spaced, and a distance between any two adjacent incident rays is p.

According to a known refractive index of the deformation area 203 of the transparent panel, a known radian of each location on the outer surface of the deformation area 203, and the law of light refraction, it may be determined that a distance between any two adjacent incident rays is q when the incident rays are incident on a bottom of the deformation area 203 after being refracted by the deformation area 203.

Because the incident rays are refracted at different locations in the deformation area 203, values of distances q between couples of adjacent incident rays are unequal, that is, the different locations in the deformation area 203 have different optical deformation parameters.

When an optical deformation parameter of any location in the deformation area 203 is determined, a distance p between two adjacent incident rays that are incident on the location in the deformation area 203 and a distance q between the two incident rays when the two incident rays are incident on the bottom of the deformation area 203 are first determined, and the optical deformation parameter of the location is p/q.

It may be learned that, by means of those shown in FIG. 5 and FIG. 6, the processor may determine the optical deformation parameter of any location in the deformation area 203.

Further, the processor may determine that an optical deformation parameter of any location in the first area of the display is an optical deformation parameter of a location that is in the deformation area 203 and that is corresponding to the first area of the display.

402. Convert, according to the optical deformation parameter of the first area, a shape of first image data to obtain second image data.

Figure 7:
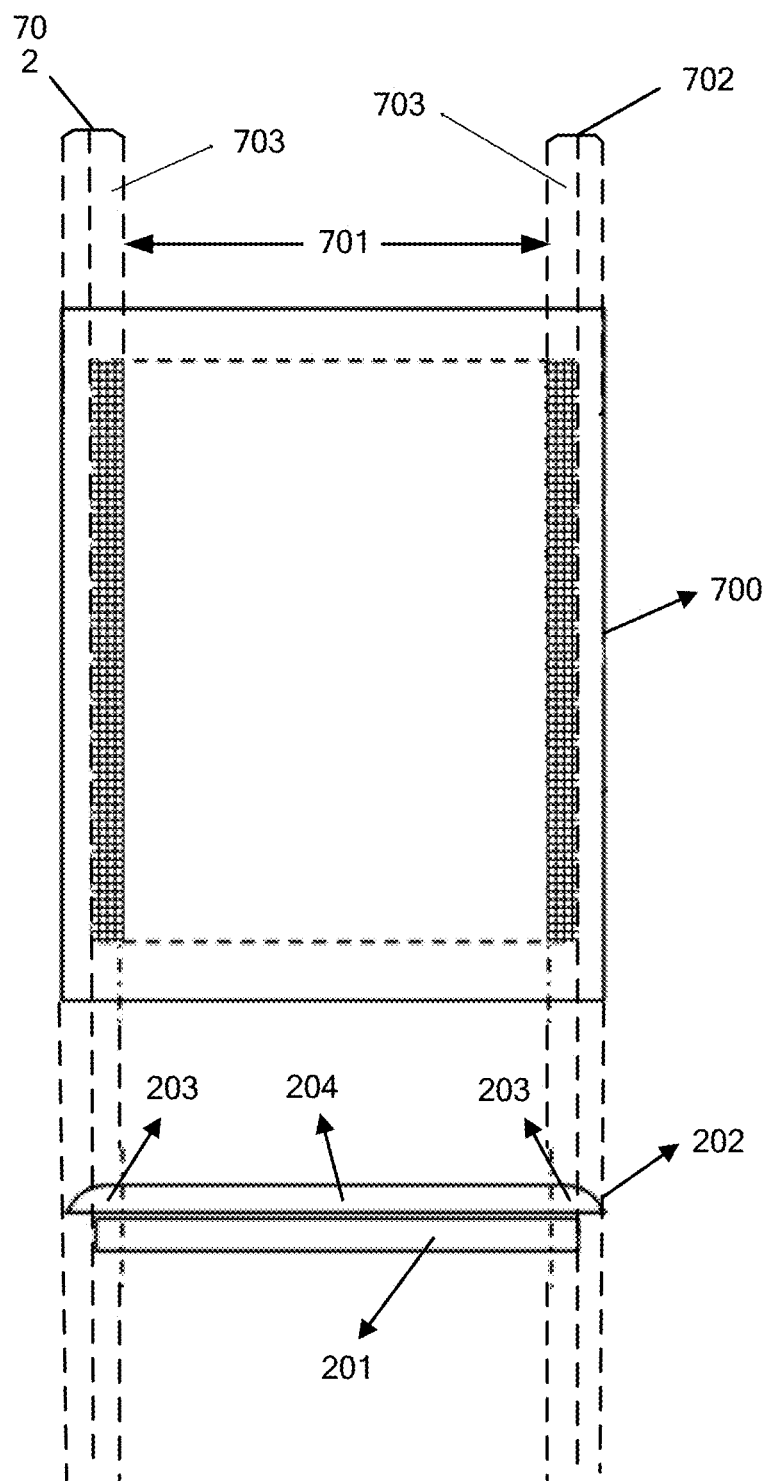
FIG. 7 is a schematic diagram of corresponding structures of a transparent panel and a display according to an embodiment of the present invention.

As shown in FIG. 7, the processor performs division processing on a to-be-displayed image 700, so as to form first image data 702 and third image data 701.

The first image data 702 is image data to be displayed in the deformation area 203 of the transparent panel 202, and the third image data 701 is image data to be displayed in the non-deformation area 204.

In this embodiment, because the non-deformation area 204 is parallel to the surface of the display 501, that is, because the non-deformation area 204 has no deformation effect on the third image data 701, the processor does not process the third image data 701.

It may be learned from the foregoing that, the deformation area 203 of the transparent panel 202 has an amplification effect on an image to be displayed by the display, and an image displayed by using the transparent panel 202 is linearly distorted. However, in this embodiment, the processor can obtain the optical deformation parameter of the deformation area 203, the processor can determine the optical deformation parameter of the first area that is of the display and that is corresponding to a location in the deformation area 203, and therefore the processor is further enabled to first perform shrink processing on the first image data 702 according to the optical deformation parameter of the first area, so as to obtain the second image data 703, so that linear image distortion does not appear after the second image data 703 is refracted by the transparent panel 202.

This embodiment constitutes no limitation on a specific process of converting a shape of the first image data 702 to obtain the second image data 703, so long as a width of each pixel in the first image data 702 is equal to a width of each pixel in the second image data 703 in a change direction of the optical deformation parameter of the first area.

403. Display the second image data in the first area.

The processor combines the second image data 703 and the third image data 701, so that the display displays combined image data.

Specifically, the processor uses the display to display an image obtained by combining the second image data 703 and the third image data 701, so that the second image data 703 is displayed in the deformation area 203 of the transparent panel and the third image data 701 is displayed in the non-deformation area 204 of the transparent panel.

It may be learned from the foregoing that, the display that has a planar structure is covered by the transparent panel, an area of the display is less than an area of the transparent panel, and a deformation area on an edge of the transparent panel is on an outer side of an edge of the display.

If the display method shown in this embodiment is not used, an image displayed in the deformation area of the transparent panel is deformed because the optical deformation parameter of the deformation area of the transparent panel is greater than 1. It may be learned that, if the display method shown in this embodiment is not used, an image displayed only in the non-deformation area of the transparent panel is not deformed.

However, in the display method shown in this embodiment, the image displayed in the deformation area of the transparent panel is not deformed, so that no image displayed in the deformation area and the non-deformation area of the transparent panel is deformed.

It may be learned that, a width of a non-deformed image displayed by using the display method shown in this embodiment is greater than a width of the non-deformed image displayed without using the display method shown in this embodiment, so that the width of the non-deformed image can be effectively improved in the display method shown in this embodiment, thereby improving visual experience of the user in a process of using the electronic device, and improving appearance of the electronic device.

Figure 8:
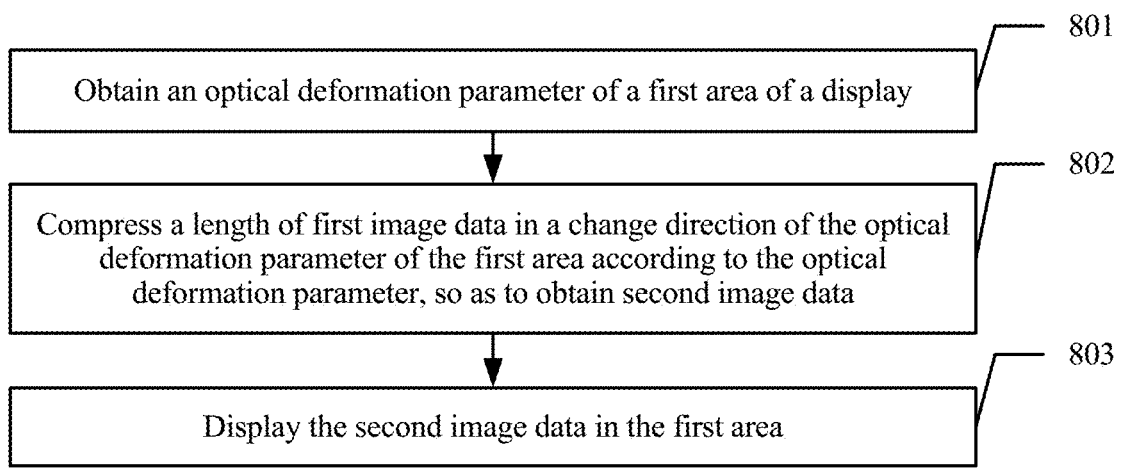
FIG. 8 is another flowchart of steps of a display method according to an embodiment of the present invention.

With reference to FIG. 8, the following describes in detail a display method provided in an embodiment.

801. Obtain an optical deformation parameter of a first area of a display.

For a specific implementation process of step 801 shown in this embodiment, refer to step 401 shown in FIG. 4. Details are not described in this embodiment.

802. Compress a length of first image data in a change direction of the optical deformation parameter of the first area according to the optical deformation parameter, so as to obtain second image data.

This embodiment describes in detail a manner of converting a shape of the first image data to obtain the second image data. It should be noted that, the following manner of converting the shape of the first image data to obtain the second image data is an optional example, and constitutes no limitation.

Optionally, a first manner of obtaining the second image data by using the first image data is as follows:

Detailed description is provided below with reference to FIG. 9. The first image data 901 is divided into at least two subareas in the change direction of the optical deformation parameter of the first area.

In the change direction of the optical deformation parameter of the first area, a subarea 903 in the first image data 901 has a width of three pixels, and a subarea 904 in the first image data 901 has a width of 2.8 pixels.

This embodiment constitutes no limitation on a width of each subarea, so long as areas obtained by mapping the at least two subareas onto the second image data 902 have an equal width.

The width is a length in the change direction of the optical deformation parameter of the first area.

Figure 9:
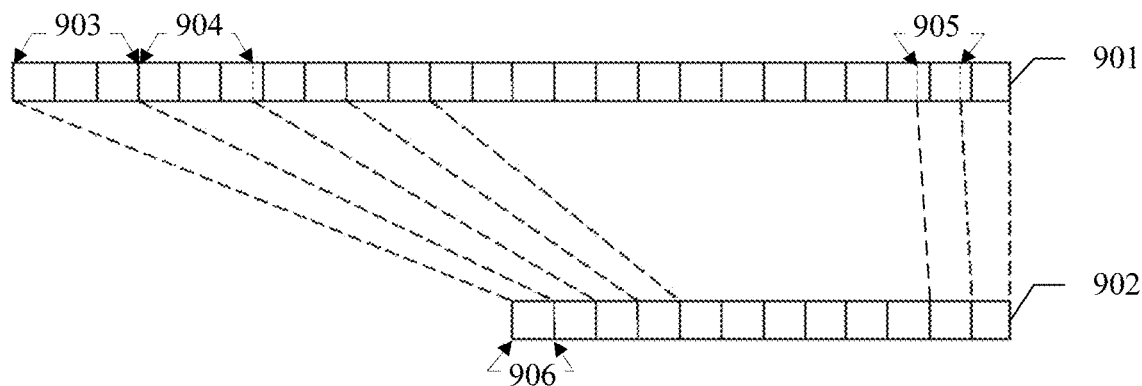
FIG. 9 is another schematic diagram of image display according to an embodiment of the present invention.

In a specific process of compressing, according to the optical deformation parameter, the length of the first image data to obtain the second image data, as shown in FIG. 9, in the change direction of the optical deformation parameter of the first area, a width of one pixel is obtained by mapping the three pixels in the subarea 903 in the first image data 901 onto the second image data 902.

In the change direction of the optical deformation parameter of the first area, a width of one pixel is obtained by mapping the 2.8 pixels in the subarea 904 in the first image data 901 onto the second image data 902.

It may be learned that, because the optical deformation parameter of the first area decreases in a direction of approaching a non-deformation area, quantities of pixels in subareas of the first image data 901 progressively decrease in the direction of approaching the non-deformation area.

It may be further learned that, in the change direction of the optical deformation parameter of the first area, a quantity of pixels in each subarea of the first image data 901 may not be an integer, and a border of each subarea may not be a border of a pixel in the first image data 901.

As shown in FIG. 9, in the change direction of the optical deformation parameter of the first area, a quantity of pixels in the subarea 903 in the first image data 901 is an integer, and a border of the subarea 903 in the first image data 901 is a border of the third pixel in the first image data 901.

In the change direction of the optical deformation parameter of the first area, a quantity of pixels in the subarea 904 in the first image data 901 is 2.8 and is not an integer, and a border of the subarea 904 in the first image data 901 is in the sixth pixel in the first image data 901, and is not a border of the pixel.

Pixels in each subarea in the at least two subareas are combined according to weights of adjacent pixels, so as to obtain the second image data.

Specifically, a pixel that is completely in any subarea has a weight of 1.

A weight of a pixel that is partially in any subarea is a ratio of a part that is of the pixel and that is in the subarea to a width of the pixel, and the ratio is less than 1.

With reference to FIG. 9, the following continues to illustrate a manner of combining, according to the weights of adjacent pixels, the pixels in each subarea to obtain the second image data.

In the change direction of the optical deformation parameter of the first area, the subarea 903 includes the three pixels, and because all the three pixels are completely in the subarea 903, all weights of the three pixels in the subarea 903 are 1.

That RGB color values of the three pixels in the subarea 903 are respectively (30, 40, 50), (40, 50, 60), and (50, 60, 70) from left to right is used as an example.

It should be noted that, this embodiment constitutes no limitation on an RGB color value of each pixel, and the RGB color value of each pixel may vary with content displayed by the display.

An RGB color value of a corresponding pixel obtained by combining the three pixels in the subarea 903 according to weights of adjacent pixels is:

$$((30\times1+40\times1+50\times1)/(1+1+1), (40\times1+50\times1+60\times1)/$$
$$(1+1+1), (50\times1+60\times1+70\times1)/(1+1+1))=(40, 50, 60).$$

In the change direction of the optical deformation parameter of the first area, the subarea 904 includes the 2.8 pixels, and weights of the pixels in the subarea 904 are respectively 1, 1, and 0.8 from left to right.

It is assumed that RGB color values of the three pixels in the subarea 904 are respectively (30, 40, 50), (39, 52, 65), and (52, 65, 78) from left to right.

An RGB color value of a corresponding pixel obtained by combining the pixels in the subarea 904 according to weights of adjacent pixels is:

$$((30\times1+39\times1+52\times0.8)/(1+1+0.8), (40\times1+52\times1+65\times$$
$$0.8)/(1+1+0.8), (50\times1+65\times1+78\times0.8)/(1+1+0.8))$$
$$=(39.5, 51.4, 63.3).$$

By analogy, pixels in all subareas of the first image data 901 are combined according to weights of adjacent pixels, so as to obtain RGB color values of corresponding pixels.

RGB color values of pixels corresponding to all the subareas of the first image data 901 are combined, so as to obtain the second image data 902.

In this manner of obtaining the second image data by using the first image data, the obtained second image data may be clearly and smoothly displayed, thereby effectively ensuring a display effect of the electronic device.

Optionally, a second manner of obtaining the second image data by using the first image data is as follows:

As shown in FIG. 9, the first image data 901 is divided into at least two subareas in the change direction of the optical deformation parameter of the first area, where areas obtained by mapping the at least two subareas onto the second image data have an equal width, and the width is a length in the change direction of the optical deformation parameter of the first area.

For specific description of dividing the first image data 901 into the at least two subareas, refer to the first manner. Details are not described in this manner.

Pixels that have highest weights in their respective subareas in the at least two subareas are combined, so as to obtain the second image data.

Specifically, in this manner, only a pixel that has a highest weight in any subarea needs to be determined, and RGB color values of the pixels that have the highest weights are combined, so as to obtain the second image data.

Specifically, a pixel on a left side of a subarea 905 in the first image data 901 has a weight of 0.3, and a pixel on a right side of the subarea 905 has a weight of 0.8. Therefore, a highest weight of a pixel in the subarea 905 is 0.8. In addition, an RGB color value of the pixel that has the highest weight is (52, 65, 78), and therefore an RGB color value of a pixel corresponding to the subarea 905 is (52, 65, 78).

If pixels in a subarea of the first image data 901 have a same weight value, a manner of selecting a pixel used to obtain the second image data 902 by means of combination is as follows:

Optionally, in the change direction of the optical deformation parameter of the first area, a pixel is randomly selected from the pixels that have the same weight value.

Optionally, in the change direction of the optical deformation parameter of the first area, a pixel at a middle position of the subarea is selected from the pixels that have the same weight value.

For example, the subarea 903 of the first image data 901 has a width of three pixels, and because all the three pixels are completely in the subarea 903, all the weights of the three pixels in the subarea 903 are 1.

In this case, any pixel may be selected to obtain the second image data by means of combination, or a pixel at a middle position of the subarea 903 is selected, that is, the second pixel in the subarea 903 is selected.

An RGB color value of the selected second pixel in the subarea 903 is (39, 52, 65), and therefore an RGB color value of a pixel corresponding to the subarea 903 is (39, 52, 65).

By analogy, pixels that have highest weights in all subareas of the first image data 901 are combined, so as to obtain the second image data 902.

In this manner of obtaining the second image data by using the first image data, only one pixel in the subarea of the first image data 901 is selected for combination, so as to obtain the second image data 902, and therefore, calculation is effectively reduced, and a delay in a process of converting the shape of the first image data to obtain the second image data is effectively reduced, thereby improving use experience of a user.

Optionally, a third manner of obtaining the second image data by using the first image data is as follows:

Detailed description is provided below with reference to FIG. 10. The first image data 1001 is divided into at least two subareas in the change direction of the optical deformation parameter of the first area.

The at least two subareas have an equal width.

If different locations on the display have different optical deformation parameters, to ensure that an image refracted by a transparent panel is not linearly distorted, areas obtained by mapping the at least two subareas of the first image data 1001 onto the second image data 1002 have unequal widths, and the width is a length in the change direction of the optical deformation parameter of the first area.

Specifically, the widths of the areas obtained by mapping the subareas onto the second image data progressively increase in a direction of approaching a second area of the display.

More specifically, the second area of the display is an area whose optical deformation parameter is 1.

More specifically, the second area of the display is an area that is parallel to a surface of a non-deformation area of the transparent panel.

Figure 10:
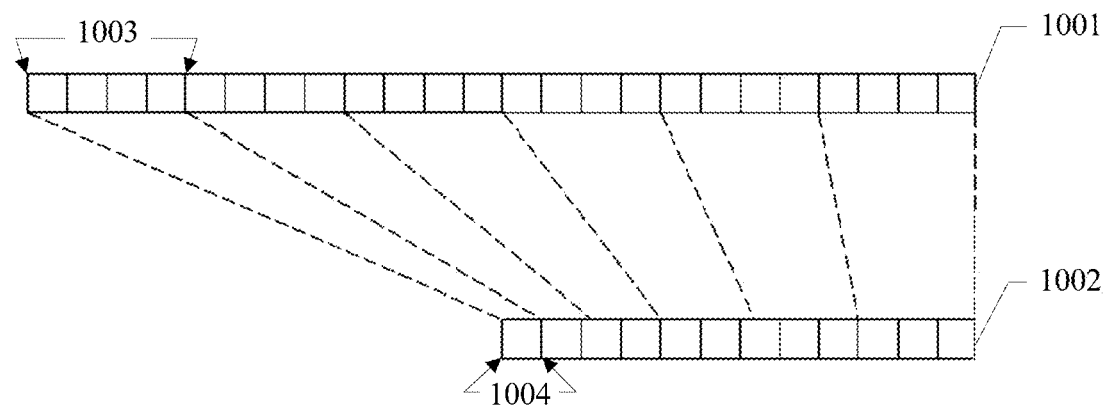
FIG. 10 is another schematic diagram of image display according to an embodiment of the present invention.

As shown in FIG. 10, any subarea of the first image data 1001 has a width of four pixels.

It should be noted that, this embodiment constitutes no limitation on a width of each subarea of the first image data 1001, so long as all subareas of the first image data 1001 have an equal width.

Pixels in each subarea in the at least two subareas are combined according to weights of adjacent pixels, so as to obtain the second image data 1002.

As shown in FIG. 10, in the change direction of the optical deformation parameter of the first area, four pixels included in a subarea 1003 of the first image data 1001 are combined into a pixel 1004 in the second image data 1002 according to weights of adjacent pixels.

For a specific combination method using weights of adjacent pixels, refer to the first manner of obtaining the second image data. Details are not described in this manner.

803. Display the second image data in the first area.

For a specific implementation process of step 803 in this embodiment, refer to step 403 shown in FIG. 4. Details are not described in this embodiment.

Figure 11:
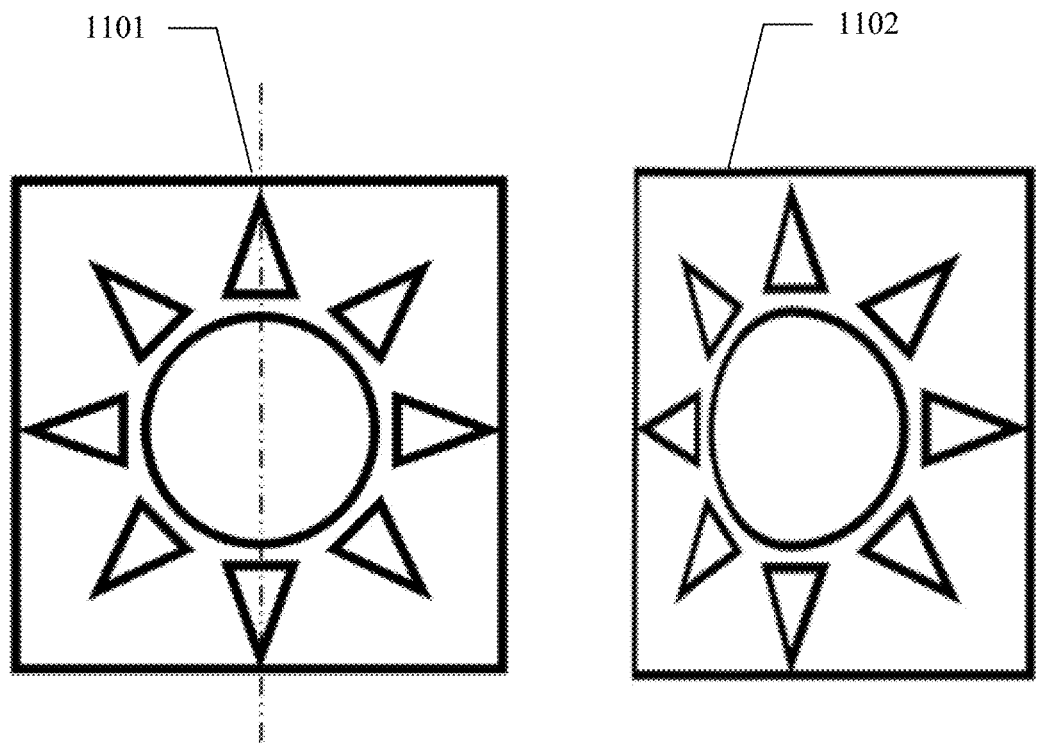
FIG. 11 is another schematic diagram of image display according to an embodiment of the present invention.

With reference to an accompanying drawing, the following describes a display effect of the display method provided in this embodiment. As shown in FIG. 11, the first image data displayed by the display is an image 1101 shown in FIG. 11. The second image data obtained by converting the shape of the first image data according to the optical deformation parameter of the first area of the display by using the display method shown in this embodiment is an image 1102 shown in FIG. 11. Because the second image data needs to be refracted by the transparent panel before being viewed by the user, the image 1102 shown in FIG. 11 is refracted by the transparent panel to form the image 1101 shown in FIG. 11. It may be learned that, in the display method shown in this embodiment, deformation of an image displayed on an edge of the transparent panel can be effectively avoided, and the image may be clearly and smoothly displayed on the transparent panel, thereby effectively ensuring a display effect of the electronic device.

Figure 12:
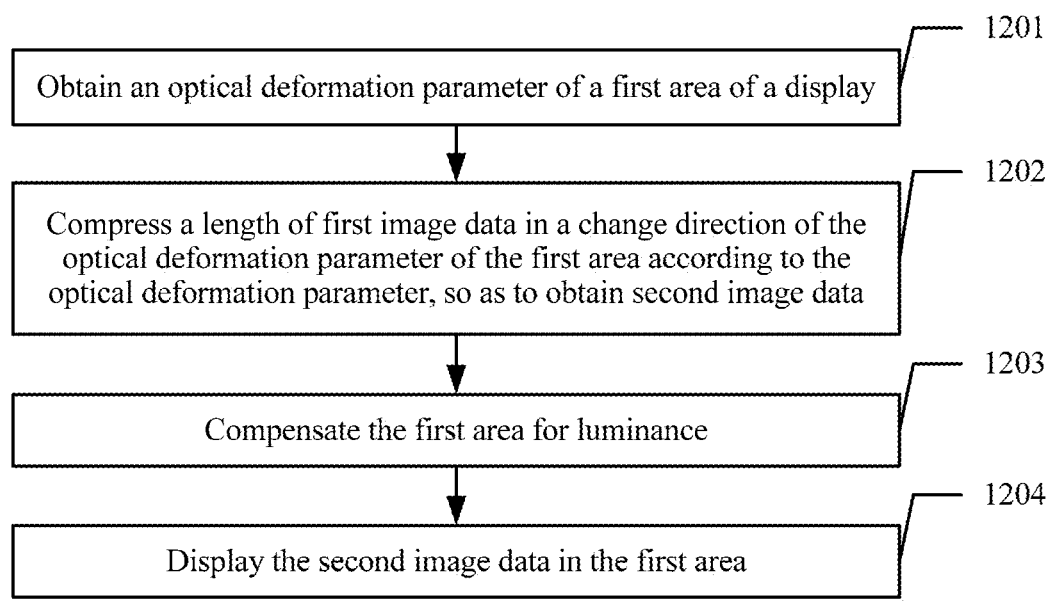
FIG. 12 is another flowchart of steps of a display method according to an embodiment of the present invention.

With reference to FIG. 12, the following describes a manner that is of performing luminance compensation to further improve definition of an image displayed on a transparent panel of an electronic device and that is in the display method provided in this embodiment.

1201. Obtain an optical deformation parameter of a first area of a display.

1202. Compress a length of first image data in a change direction of the optical deformation parameter of the first area according to the optical deformation parameter, so as to obtain second image data.

For a specific implementation process of step 1201 and step 1202 in this embodiment, refer to step 801 and step 802 shown in FIG. 8. Details are not described in this embodiment.

1203. Compensate the first area for luminance.

It should be noted that, a sequence of executing step 1203 and step 1202 shown in this embodiment is not limited in this embodiment, so long as the image displayed on the transparent panel can be effectively compensated for luminance by performing step 1203.

For example, if step 1202 is performed before step 1203, after the second image data is obtained by performing step 1202, step 1203 specifically includes the following steps.

Step A1: Extract luminance channel data from the second image data.

In step 1202, an RGB color value of each pixel in the second image data may be determined.

The RGB color value of each pixel in the second image data is converted into luminance channel data of each pixel in the second image data. For a specific conversion manner, refer to the following conversion matrix:

$$\begin{bmatrix} Y \\ Cr \\ Cb \end{bmatrix} = \begin{bmatrix} 0.257 & 0.504 & 0.098 \\ -0.148 & -0.291 & 0.439 \\ 0.439 & -0.368 & -0.071 \end{bmatrix} \times \left( \begin{bmatrix} R \\ G \\ B \end{bmatrix} + \begin{bmatrix} 16 \\ 128 \\ 128 \end{bmatrix} \right).$$

The RGB color value of each pixel in the second image data can be converted into YCrCb color space by using the conversion matrix.

The YCrCb color space is color space based on human perception.

In the YCrCb color space, Y is a luminance value, and CrCb is a color value used to color Y.

In this embodiment, the RGB color value of each pixel in the second image data is converted into the YCrCb color space to obtain a Y value, and the Y value is the luminance channel data of the second image data.

Step A2: Proportionally convert the luminance channel data in the change direction of the optical deformation parameter of the first area according to the optical deformation parameter.

It may be learned from the foregoing embodiment that, each pixel in the second image data is corresponding to an optical deformation parameter of the first area, and in this embodiment, proportional conversion is implemented by multiplying the luminance channel data of each pixel in the second image data by a corresponding proportionality coefficient.

Specifically, there is a one-to-one correspondence between the optical deformation parameter of the first area, the luminance channel data of each pixel in the second image data, and the proportionality coefficient.

More specifically, proportionality coefficients progressively decrease in a direction of approaching a second area of the display.

For specific description of the second area of the display, refer to the foregoing description. Details are not described herein again.

More specifically, in the second image data, a pixel in the second area has a proportionality coefficient 1.1, a pixel at an edge location of the display (that is, a pixel farthest from a location in the second area of the display) has a corresponding proportionality coefficient 4, and a pixel between the pixel in the second area and the pixel at the edge location of the display has a corresponding proportionality coefficient between 1.1 and 4.

It should be noted that, the foregoing values of the proportionality coefficients are only an optional example, and a person skilled in the art may understand that, the proportionality coefficients are not limited to the foregoing values, so long as the proportionality coefficients progressively decrease in the direction of approaching the second area of the display.

FIG. 9 is used as an example. The pixel 906 in the second image data has a corresponding proportionality coefficient 4, and after luminance channel data of the pixel 906 in the second image data is obtained, the luminance channel data may be multiplied by 4.

By analogy, luminance channel data Y of all pixels in the second image data is proportionally converted, so as to obtain Y'.

It may be learned that, in the display method shown in this embodiment, a luminance value of the pixel in the second image data can be proportionally increased.

Step A3: Restore converted luminance channel data to the second image data.

A specific restoration process is as follows: Y'CrCb color space is obtained according to the proportionally converted luminance channel data Y' of the second image data, and the Y'CrCb color space is converted into an RGB color value according to the following conversion matrix:

$$\begin{bmatrix} R \\ G \\ B \end{bmatrix} = \begin{bmatrix} 1 & -0.001 & 1.402 \\ 1 & -0.3441 & -0.7141 \\ 1 & 1.772 & 0.001 \end{bmatrix} \times \left( \begin{bmatrix} Y' \\ Cr \\ Cb \end{bmatrix} - \begin{bmatrix} 16 \\ 128 \\ 128 \end{bmatrix} \right).$$

The new RGB color value may be obtained by using the conversion matrix.

The new RGB color value is restored to the second image data.

The foregoing steps A1 to A3 describe luminance compensation implementation in which step 1202 is performed before step 1203. The following describes luminance compensation implementation in which step 1203 is performed before step 1202.

In this case, step 1203 specifically includes the following steps.

B1. Extract luminance channel data from the first image data.

In step B1, an RGB color value of each pixel in the first image data is first determined.

The RGB color value of each pixel in the first image data is converted into luminance channel data of each pixel in the first image data. A specific conversion manner is the same as the manner in which the RGB color value of each pixel in the second image data is converted into the luminance channel data of each pixel in the second image data by using the conversion matrix, and details are not described again.

It may be learned that, the RGB color value of each pixel in the first image data is converted into YCrCb color space to obtain a Y value, and the Y value is the luminance channel data of the first image data.

Step B2: Proportionally convert the luminance channel data in the change direction of the optical deformation parameter of the first area according to the optical deformation parameter.

There is a one-to-one correspondence between the optical deformation parameter of the first area, the luminance channel data of each pixel in the first image data, and a proportionality coefficient.

More specifically, proportionality coefficients progressively decrease in a direction of approaching a second area of the display.

More specifically, in the first image data, a pixel in the first area has a proportionality coefficient 1.1, a pixel at an edge location of the display (that is, a pixel farthest from a location in the second area of the display) has a corresponding proportionality coefficient 4, and a pixel between the pixel in the first area and the pixel at the edge location of the display has a corresponding proportionality coefficient between 1.1 and 4.

It should be noted that, the foregoing values of the proportionality coefficients are only an optional example, and a person skilled in the art may understand that, the proportionality coefficients are not limited to the foregoing values, so long as the proportionality coefficients progressively decrease in the direction of approaching the second area.

Step B3: Restore converted luminance channel data to the first image data.

For a specific restoration process, refer to the specific process of restoring the converted luminance channel data to the second image data in step A3. Details are not described again.

In steps B1 to B3, each pixel in the first image data may be compensated for luminance, and after luminance compensation, step 1202 may be performed. That is, a length of the first image data that is compensated for luminance is compressed, so as to obtain the second image data.

1204. Display the second image data in the first area.

For a specific implementation process of step 1204 in this embodiment, refer to step 803 shown in FIG. 8. Details are not described in this embodiment.

If the display method shown in this embodiment is not used, the first area of the transparent panel has an amplification effect on a pixel, luminance of the pixel displayed in the first area of the transparent panel is scattered, and a user visually perceives that luminance of an image displayed in the first area decreases. However, in the display method shown in this embodiment, not only an image displayed on an edge of the transparent panel is not deformed, but also a pixel to be displayed in the first area may be compensated for luminance, so that the first area of the transparent panel can display the pixel that is compensated for luminance and the luminance of the pixel displayed in the first area is not scattered, so as to avoid a disadvantage that the user visually perceives that the luminance of the image displayed in the first area decreases, and effectively improve definition of the image displayed on the transparent panel.

Figure 13:
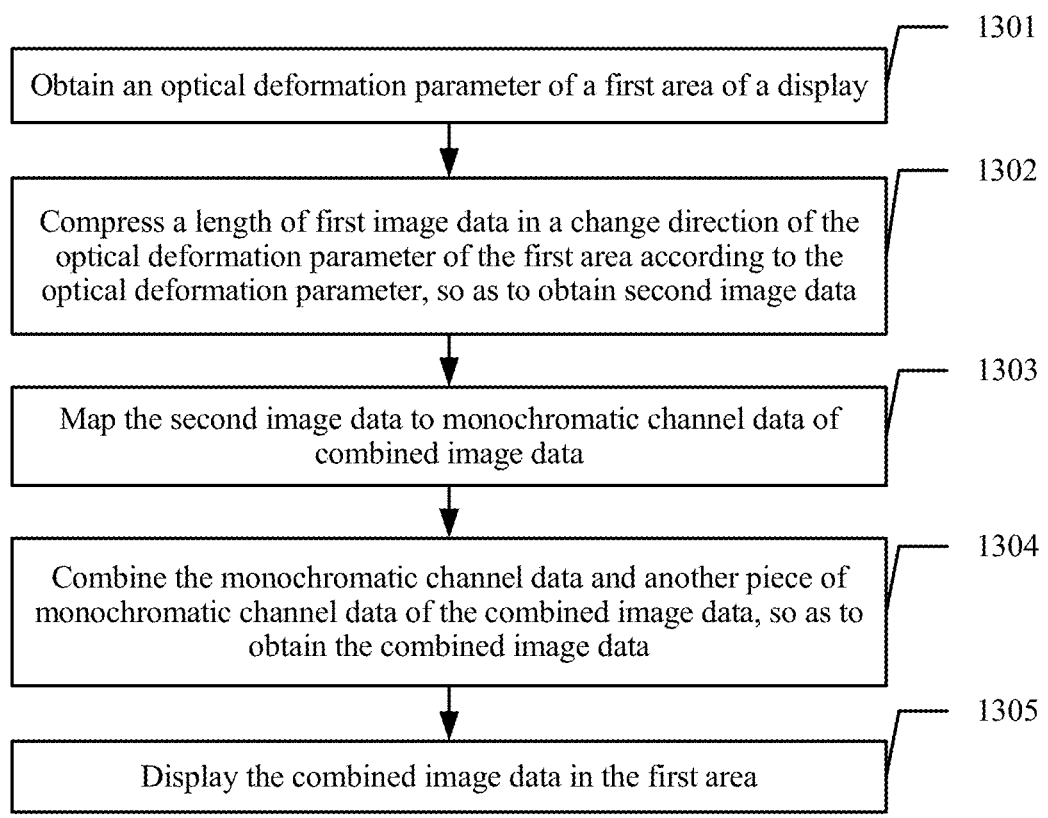
FIG. 13 is another flowchart of steps of a display method according to an embodiment of the present invention.

With reference to FIG. 13, the following describes a manner that is of performing color compensation to further improve definition of an image displayed on a transparent panel and that is in the display method provided in this embodiment.

Astigmatism of the image displayed on the transparent panel is first described.

A display does not display a single color, but displays three primary colors RGB that are mixed in different proportions.

In a process in which a color displayed by the display is refracted by the transparent panel for display, because the transparent panel has different refractive indexes for light of different wavelengths, generally, a shorter wavelength indicates a greater refractive index.

In the three primary colors, the transparent panel has a greatest refractive index for blue light, a second greatest refractive index for green light, and a smallest refractive index for red light.

If light of each of the three primary colors is regarded as monochromatic light, locations of light of at least two primary colors are shifted, and a dispersion phenomenon appears.

To avoid the dispersion phenomenon, this embodiment provides the following steps.

1301. Obtain an optical deformation parameter of a first area of the display.

For a specific implementation process of step 1301 in this embodiment, refer to step 801 shown in FIG. 8. Details are not described in this embodiment.

1302. Compress a length of first image data in a change direction of the optical deformation parameter of the first area according to the optical deformation parameter, so as to obtain second image data.

In this embodiment, the first image data is monochromatic image data, and the optical deformation parameter is specifically an optical deformation parameter of monochromatic light corresponding to the first image data.

It may be learned that, in this embodiment, an image to be displayed by the display is decomposed into three primary-color images, that is, decomposed into three pieces of first image data of different primary colors: one piece of first image data including only the red color, one piece of first image data including only the blue color, and one piece of first image data including only the green color.

Figure 14:
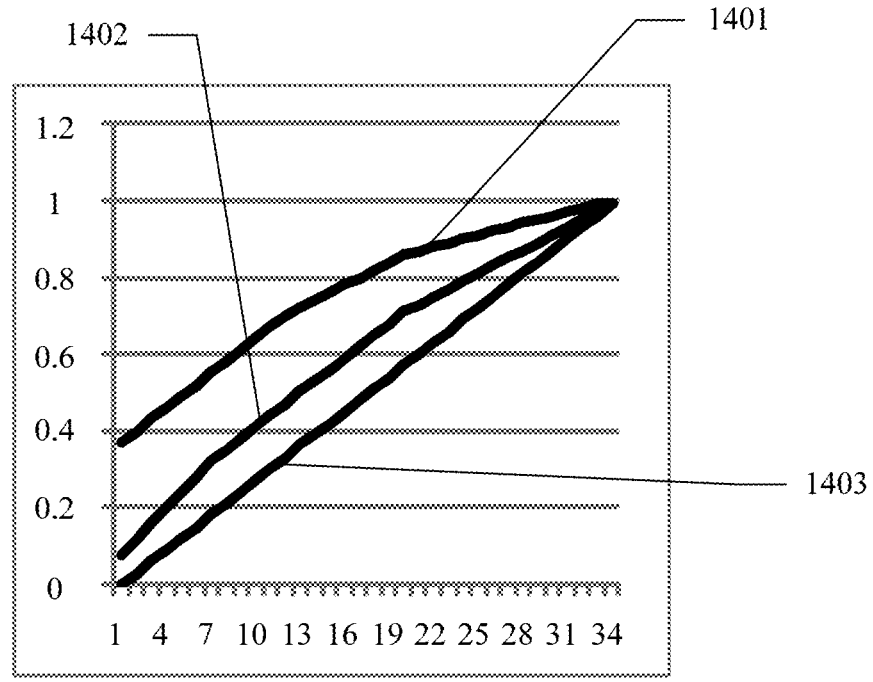
FIG. 14 is another schematic diagram of image display according to an embodiment of the present invention.

Specifically, as shown in FIG. 14, a horizontal coordinate in FIG. 14 represents the first area of the display, and an origin of the horizontal coordinate represents an edge that is of the first area of the display and that is far from a second area of the display.

A vertical coordinate is a deformation coefficient of the three primary colors in the first area.

A deformation curve 1401 shown in FIG. 14 is a deformation curve of the red color, a deformation curve 1402 is a deformation curve of the green color, and a deformation curve 1403 is a deformation curve of the blue color.

It may be learned from the deformation curves shown in FIG. 14 that, the deformation curve of the red color is relatively gentle, the deformation curve of the blue color is relatively steep, and the deformation curve of the green color is between the deformation curve of the red color and the deformation curve of the blue color.

In this embodiment, lengths of the three pieces of first image data including different colors are separately compressed. For a specific length compression method, refer to step 802. Details are not described in this embodiment.

1303. Map the second image data to monochromatic channel data of combined image data.

Specifically, in an embodiment, the first image data including the red color is converted into first monochromatic channel data of the combined image data, the first image data including the blue color is converted into second monochromatic channel data of the combined image data, and the first image data including the green color is converted into third monochromatic channel data of the combined image data.

The pieces of monochromatic channel data are used to obtain the image data by means of combination.

1304. Combine the monochromatic channel data and another piece of monochromatic channel data of the combined image data, so as to obtain the combined image data.

Specifically, the first monochromatic channel data, the second monochromatic channel data, and the third monochromatic channel data are combined, so as to form the combined image data.

The combined image data is overlaid to form a color image displayed on the display, and because the three primary colors have different refractive indexes, there is a double image of different colors on the display.

Specifically, when the display displays the combined image data, the red color is closer to an edge, the blue color is closer to the interior, and the green color is between the red color and the blue color.

1305. Display the combined image data in the first area.

After the image displayed in the first area of the display is refracted by the deformation area of the transparent panel, the three primary colors refracted by the deformation area of the transparent panel implement registration, so that true colors can be restored to the image displayed on the transparent panel.

In this embodiment, the method shown in FIG. 12 is further used to perform luminance compensation. For a specific luminance compensation method, refer to FIG. 12. Details are not described in this embodiment.

It may be learned that, in the display method shown in this embodiment, a location shift and a dispersion phenomenon of the image refracted by the transparent panel can be effectively avoided, so that a true color of the image data displayed by the display can be restored in this embodiment, and a display effect and definition of the image displayed on the transparent panel are effectively improved.

Figure 15:
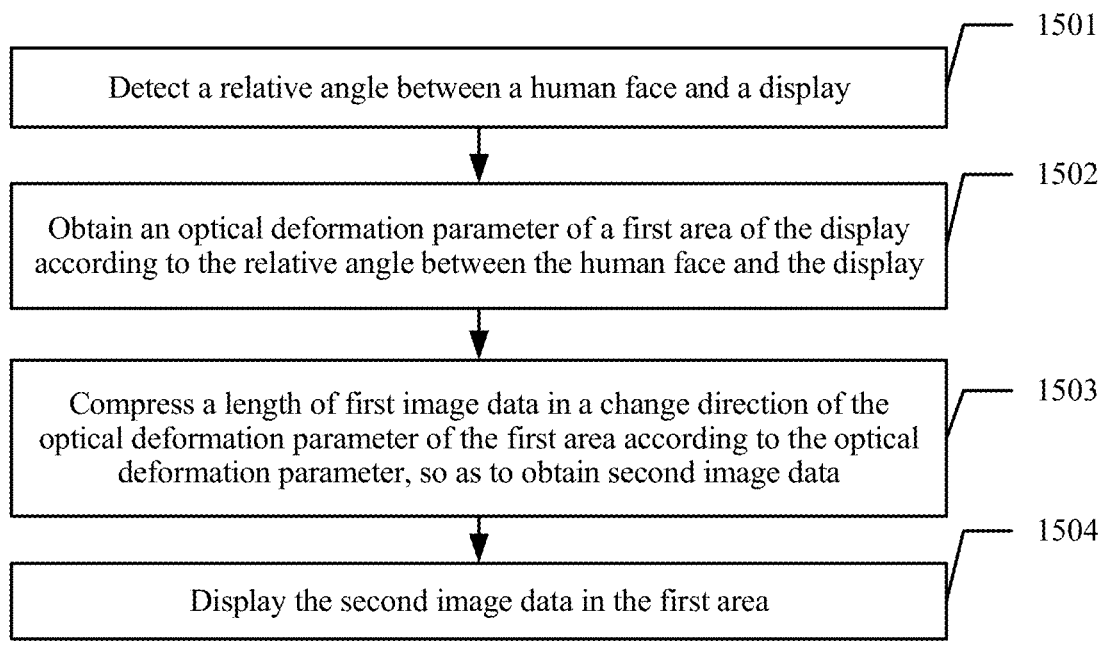
FIG. 15 is another flowchart of steps of a display method according to an embodiment of the present invention.

With reference to an embodiment shown in FIG. 15, the following describes a manner of dynamically avoiding image deformation in a first area of a transparent panel when an angle at which a user views the transparent panel of an electronic device changes.

A display method includes the following steps.

1501. Detect a relative angle between a human face and a display.

In this embodiment, the relative angle between the human face and the display may be detected by using a front-facing camera of the electronic device.

Specifically, the relative angle between the human face and the display may be determined according to a human face image captured by the front-facing camera.

Figure 16:
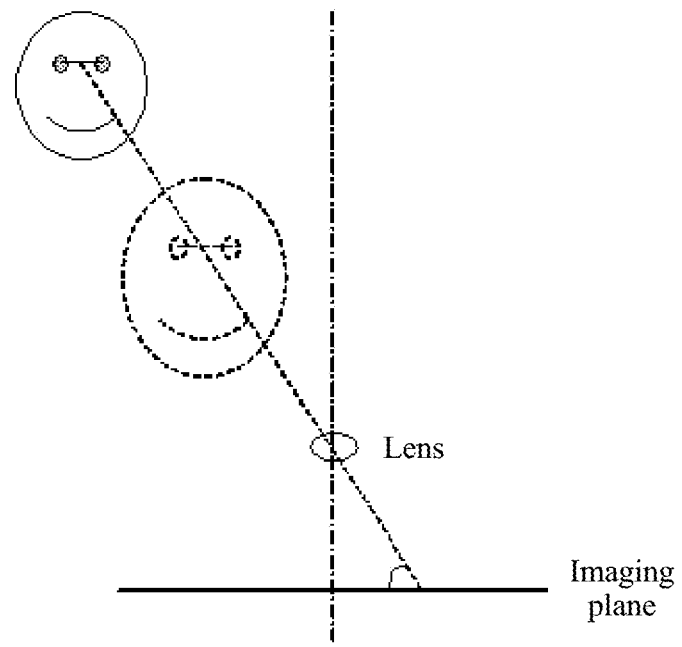
FIG. 16 is another schematic diagram of image display according to an embodiment of the present invention.

More specifically, as shown in FIG. 16, because an imaging plane of the front-facing camera is a plane and the human face may move backward or forward, or leftward or rightward in space, when the relative angle between the human face and the display remains the same and a distance from a lens to the imaging plane remains the same, a distance from a midpoint of a connecting line of eyes on the human face to a longitudinal center line of the imaging plane remains the same, regardless of how far the human face is. When a parameter of the front-facing camera is determined, a relationship between the distance from the midpoint of the connecting line of the eyes on the human face to the longitudinal center line of the imaging plane and the relative angle between the human face and the display is determined.

It may be learned that, the relative angle between the human face and the display is related to only the distance from the midpoint of the connecting line of the eyes on the human face to the longitudinal center line of the imaging plane, and is unrelated to a distance from the human face to the display.

Figure 17:
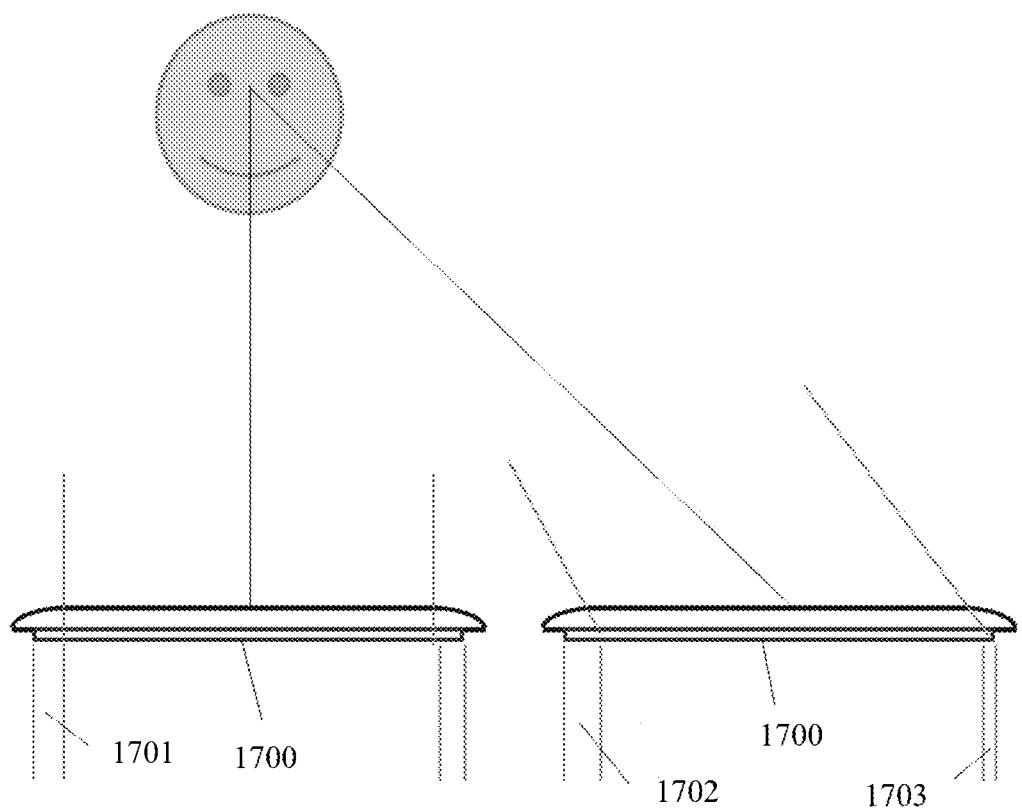
FIG. 17 is another schematic diagram of image display according to an embodiment of the present invention.

As shown in FIG. 17, a left side of FIG. 17 shows a situation in which the human face squarely faces the display of the electronic device, and a right side of FIG. 17 shows a situation in which the human face laterally faces the display of the electronic device.

When the human face laterally faces the display of the electronic device, the relative angle between the human face and the display extends on a display 1700, and therefore a width of a first area on the display 1700 is changed.

It may be learned that, when the human face squarely faces the display of the electronic device, as shown in FIG. 17, first areas 1701 on two sides of the display 1700 have an equal width.

When the human face laterally faces the display of the electronic device, as shown in the right side of FIG. 17, because the display 1700 has a refraction effect on light, a first area 1702 that is of the display 1700 and that is close to the user becomes wider relative to the first area 1701 shown in the left side of FIG. 17, and a first area 1703 that is of the display 1700 and that is far from the user becomes narrower relative to the first area 1701 shown in the left side of FIG. 17.

It may be learned that, when there is a different relative angle between the human face and the display, the first area of the display 1700 has a different width.

1502. Obtain an optical deformation parameter of a first area of the display according to the relative angle between the human face and the display.

In this embodiment, multiple angle intervals are preset, and a one-to-one correspondence between each angle space and an optical deformation parameter is established. When the relative angle between the human face and the display is determined, an angle interval to which the relative angle between the human face and the display belongs is determined, and an optical deformation parameter corresponding to the angle space may be further determined.

Certainly, a correspondence between each angle space and a width of the first area may be further established. When the relative angle between the human face and the display is determined, the angle interval to which the relative angle between the human face and the display belongs is determined, and a width that is of the first area and that is corresponding to the angle space may be further determined.

It may be learned that, when there is a different relative angle between the human face and the display, a different optical deformation parameter and a different width of the first area may be determined.

1503. Compress a length of first image data in a change direction of the optical deformation parameter of the first area according to the optical deformation parameter, so as to obtain second image data.

1504. Display the second image data in the first area.

Specifically, for a specific implementation process of step 1503 and step 1504 that are shown in this embodiment, refer to step 802 and step 803 that are shown in FIG. 8. Details are not described in this embodiment.

In the display method shown in this embodiment, a different optical deformation parameter of the first area of the display can be determined according to a different relative angle between the human face and the display, and the length of the first image data is further compressed according to the optical deformation parameter of the first area of the display, so as to obtain the second image data. It may be learned that, in the method shown in this embodiment, the optical deformation parameter can be correspondingly modified according to the different relative angle between the human face and the display, so that clearness and smoothness of the image displayed on the transparent panel can still be effectively ensured when the relative angle between the human face and the display changes in a use process of the user, thereby effectively ensuring a display effect of the electronic device.

The following describes a handheld electronic device that can implement the display method shown above.

The handheld electronic device shown in this embodiment includes a processor 103 and a display 101.

For a specific structure of the handheld electronic device shown in this embodiment, refer to FIG. 1. The output unit 101 shown in FIG. 1 is the display 101 shown in this embodiment.

For the specific structure of the handheld electronic device shown in this embodiment, refer to the embodiment shown in FIG. 1. Details are not described in this embodiment.

In this embodiment, a surface of the display is covered by a transparent panel.

A deformation area of the transparent panel has a cylindrical curved surface, and an area that is on the display and that is corresponding to the deformation area of the transparent panel is a first area of the display.

Specifically, for a specific structure of the transparent panel, refer to the embodiments shown in FIG. 2 and FIG. 3. Details are not described in this embodiment.

The following describes in detail a manner in which the handheld electronic device provided in this embodiment effectively avoids non-linear stretching of an image displayed by the display 101.

The processor 103 is configured to: obtain an optical deformation parameter of the first area; and convert, according to the optical deformation parameter of the first area, a shape of first image data to obtain second image data, where the first image data is image data to be displayed in the first area.

The first area of the display is used to display the second image data.

For a specific implementation process of the processor 103, refer to the embodiment shown in FIG. 4. Details are not described in this embodiment.

It may be learned that, the display that has a planar structure is covered by the transparent panel, an area of the display is less than an area of the transparent panel, and a deformation area on an edge of the transparent panel is on an outer side of an edge of the display.

If the handheld electronic device shown in this embodiment is not used, an image displayed in the deformation area of the transparent panel is deformed because an optical deformation parameter of the deformation area of the transparent panel is greater than 1. It may be learned that, if the handheld electronic device shown in this embodiment is not used, an image displayed only in a non-deformation area of the transparent panel is not deformed.

However, according to the handheld electronic device shown in this embodiment, the image displayed in the deformation area of the transparent panel is not deformed, so that no image displayed in the deformation area and the non-deformation area of the transparent panel is deformed.

It may be learned that, a width of a non-deformed image displayed by using the handheld electronic device shown in this embodiment is greater than a width of the non-deformed image displayed without using the handheld electronic device shown in this embodiment, so that the width of the non-deformed image can be effectively improved by using the handheld electronic device shown in this embodiment, thereby improving visual experience of the user in a process of using the electronic device, and improving appearance of the electronic device.

The following describes in detail a specific manner in which the processor 103 compresses a length of the first image data to obtain the second image data.

Specifically, the processor 103 is further configured to compress the length of the first image data in a change direction of the optical deformation parameter of the first area according to the optical deformation parameter, so as to obtain the second image data.

Optionally, the processor 103 is configured to: divide the first image data into at least two subareas in the change direction of the optical deformation parameter of the first area, where areas obtained by mapping the at least two subareas onto the second image data have an equal width, and the width is a length in the change direction of the optical deformation parameter of the first area; and combine pixels in each subarea in the at least two subareas according to weights of adjacent pixels, so as to obtain the second image data.

Optionally, the processor 103 is configured to: divide the first image data into at least two subareas in the change direction of the optical deformation parameter of the first area, where areas obtained by mapping the at least two subareas onto the second image data have an equal width, and the width is a length in the change direction of the optical deformation parameter of the first area; and combine pixels that have highest weights in their respective subareas in the at least two subareas, so as to obtain the second image data.

Optionally, the processor 103 is configured to: divide the first image data into at least two subareas in the change direction of the optical deformation parameter of the first area, where the at least two subareas have an equal width, areas obtained by mapping the at least two subareas onto the second image data have unequal widths, the widths of the areas obtained by mapping the subareas onto the second image data progressively increase in a direction of approaching a second area of the display, the second area of the display is an area whose optical deformation parameter is 1, and the width is a length in the change direction of the optical deformation parameter of the first area; and combine pixels in each subarea in the at least two subareas according to weights of adjacent pixels, so as to obtain the second image data.

The optical deformation parameter is a ratio of a width of a pixel set displayed by the display to a width of a to-be-displayed pixel set, the pixel set includes at least one pixel, and the pixel set is at any location in the first area.

The first area is an area that is on the display and whose optical deformation parameter is greater than 1.

In this embodiment, for a specific implementation process of compressing the length of the first image data by the processor 103 to obtain the second image data, refer to the embodiment shown in FIG. 8. Details are not described in this embodiment.

Specifically, the processor 103 is further configured to compensate the first area for luminance.

Optionally, the processor 103 is further configured to: extract luminance channel data from the second image data; proportionally convert the luminance channel data in the change direction of the optical deformation parameter of the first area according to the optical deformation parameter; and restore converted luminance channel data to the second image data.

For a specific implementation process of compensating the first area for luminance by the processor 103 in this embodiment, refer to the embodiment shown in FIG. 12. Details are not described in this embodiment.

Figure 18:
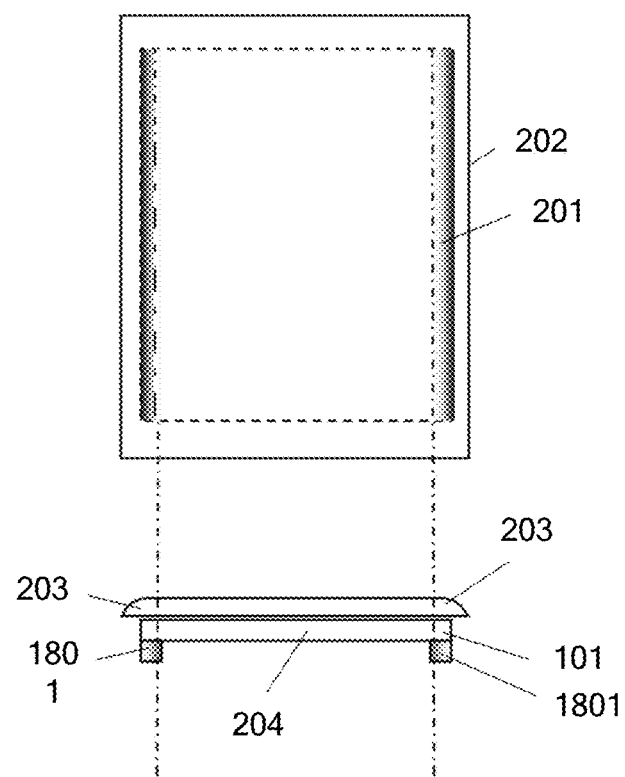
FIG. 18 is another schematic diagram of corresponding structures of a transparent panel and a display according to an embodiment of the present invention.

Optionally, the handheld electronic device provided in this embodiment can further compensate the first area for luminance from a perspective of hardware. FIG. 18 is used as an example, and the handheld electronic device further includes a backlight module 1801.

The backlight module 1801 is disposed at a location corresponding to the first area 1801.

Specifically, the backlight module 1801 is independently disposed beneath the first area 1801.

This embodiment constitutes no limitation on the backlight module 1801, so long as the backlight module 1801 can emit light under control of the processor 103.

The backlight module 1801 is configured to compensate the deformation area 203 for luminance under control of the processor 103.

In a specific application process, the processor 103 can adjust backlight of the first area by using the backlight module 1801, so that a backlight intensity of the first area is in direct proportion to the optical deformation parameter of the area. That is, backlight intensities of the first area progressively decrease in the direction of approaching the second area.

For specific description of the first area and the second area, refer to the embodiments shown in FIG. 2 and FIG. 3. Details are not described in this embodiment again.

Because the handheld electronic device provided in this embodiment has a luminance compensation function, an image displayed on the edge of the transparent panel is not deformed, and a pixel to be displayed in the first area may be compensated for luminance, so that the first area of the display can display the pixel that is compensated for luminance and the luminance of the pixel displayed in the first area is not scattered, so as to avoid a disadvantage that the user visually perceives that the luminance of the image displayed in the first area decreases, and effectively improve definition of the image displayed on the transparent panel.

The following describes a manner in which the handheld electronic device provided in this embodiment performs color compensation.

The processor 103 is further configured to: map the second image data to monochromatic channel data of combined image data; and
combine the monochromatic channel data and another piece of monochromatic channel data of the combined image data, so as to obtain the combined image data, where the first image data is the monochromatic image data, and the optical deformation parameter is specifically an optical deformation parameter of monochromatic light corresponding to the first image data.

The display 101 is configured to display the combined image data in the first area.

For a specific implementation process of performing color compensation by the handheld electronic device provided in this embodiment, refer to the embodiment shown in FIG. 13. Details are not described in this embodiment.

The following describes a manner in which the handheld electronic device provided in this embodiment dynamically avoids image deformation on the transparent panel.

Specifically, the input unit 107 of the handheld electronic device provided in this embodiment includes a front-facing camera 108.

The front-facing camera 108 is configured to collect a human face image of the user, so that a human face tracing module 106 traces a view angle of the user.

Optionally, the storage unit 104 further includes a display processing module 105 and the human face tracing module 106.

The display processing module 105 is configured to process a to-be-displayed image, and send the to-be-displayed image to the display module 102 for display. The human face tracing module 106 is configured to trace a change of the view angle of the user, so as to affect a processing result of the display processing module 105.

More specifically, the front-facing camera 108 is configured to obtain the human face image.

The processor 103 is configured to detect a relative angle between a human face and the display according to the human face image.

The processor 103 is further configured to obtain the optical deformation parameter of the first area of the display according to the relative angle between the human face and the display.

For a specific manner in which the handheld electronic device shown in this embodiment dynamically avoids image deformation in the first area of the display, refer to FIG. 15. Details are not described in this embodiment.

Another embodiment of the present invention provides a solution of avoiding image deformation on an edge of a display by changing a hardware structure of a handheld electronic device.

Figure 19:
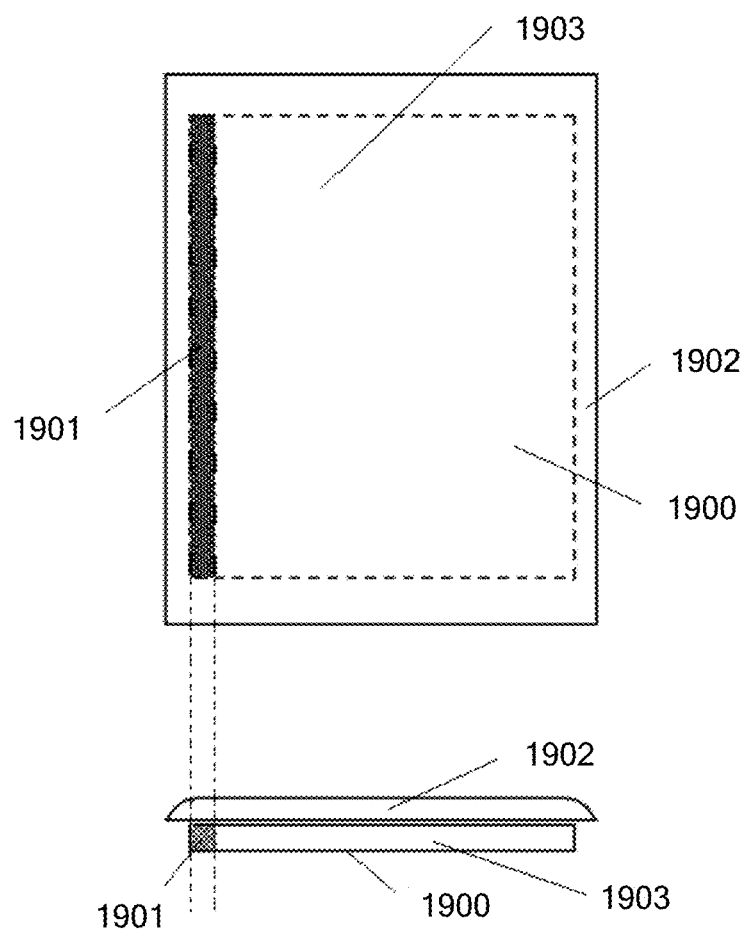
FIG. 19 is a schematic diagram of corresponding structures of a transparent panel and a display according to an embodiment of the present invention.
Figure 20:
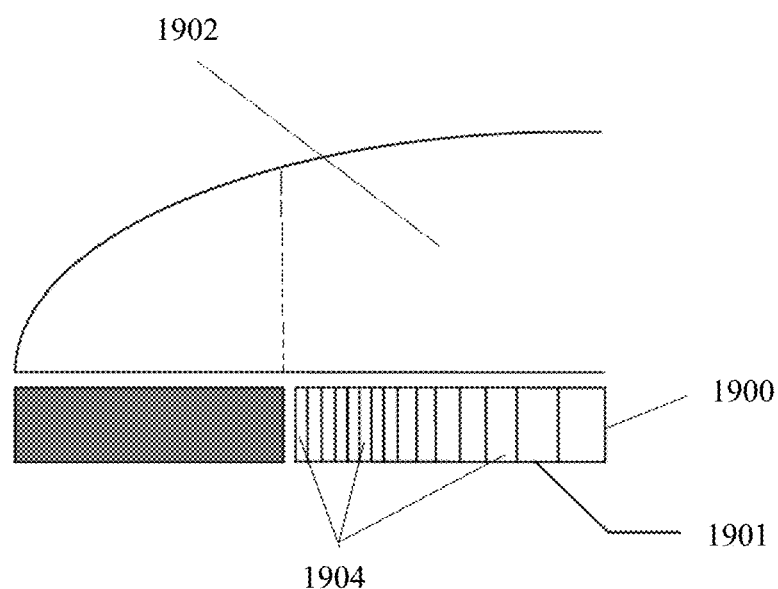
FIG. 20 is a side-view schematic diagram of partial structures of a transparent panel and a display according to an embodiment of the present invention.

For a structure of the electronic device described in this embodiment, refer to FIG. 19 and FIG. 20.

The display 1900 includes a first area 1901.

A surface of the display 1900 is covered by a transparent panel 1902, and a part that is of the transparent panel 1902 and that covers the first area 1901 has a cylindrical curved surface.

A width that is of a pixel in the first area 1901 and that is in a change direction of an optical deformation parameter of the transparent panel 1902 is in direct proportion to the optical deformation parameter.

The following describes in detail an implementation in which the width that is of the pixel in the first area 1901 of the display 1900 and that is in the change direction of the optical deformation parameter of the transparent panel 1902 is in direct proportion to the optical deformation parameter.

The first area 1901 of the display 1900 shown in this embodiment is obtained by means of a splicing technology.

Specifically, in a splicing process of the first area 1901, multiple display screens 1904 are spliced on a substrate.

Lengths of the spliced display screens 1904 of the first area 1901 are equal to a length of the display.

More specifically, the spliced display screens 1904 of the first area 1901 have different pixel densities.

To avoid distortion of an image displayed on the transparent panel, the display screens 1904 at different locations of the substrate have different pixel densities.

In a specific implementation process, the pixel densities of the display screens 1904 progressively increase in a direction of departing from a second area 1903 of the display, so that the width that is of the pixel in the first area 1901 and that is in the change direction of the optical deformation parameter of the transparent panel 1902 is in direct proportion to the optical deformation parameter.

The following describes the second area 1903 of the display.

In this embodiment, the first area 1901 of the display is located on at least one side of the second area 1903.

Specifically, a part that is of the transparent panel and that covers the second area 1903 has a planar structure, and pixels in the second area 1903 have an equal width in the change direction of the optical deformation parameter of the transparent panel.

It may be learned that, a farther distance from a location of the spliced display screen 1904 of the first area 1901 to the second area 1903 leads to a greater pixel density and a smaller pixel width.

It may be learned that, widths of pixels in the first area 1901 of the display 1900 shown in this embodiment are uneven. Description of a specific manner of creating the uneven widths of the pixels in the first area 1901 in this embodiment is only an optional example, and constitutes no limitation.

For example, the pixels include a bright area and a dark area, the bright area emits light, and the dark area is for cabling. As the pixel density increases, the cabling needs to be finer, and only a relatively high process capability can enable the cabling to be finer.

The process capability is an actual operating capability of operation in a control state (stable state) in a period.

An advantage of using the handheld electronic device shown in this embodiment is as follows: The width that is of the pixel in the first area 1901 of the display 1900 and that is in the change direction of the optical deformation parameter of the transparent panel 1902 is in direct proportion to the optical deformation parameter, so that an image displayed on an edge of the transparent panel is not deformed and no detail of the image is lost after the transparent panel refracts the pixel in the first area 1901, and no processing process needs to be added to software, thereby ensuring no delay of image display and improving a display effect and user experience.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A handheld electronic device, comprising at least one processor and a display, wherein:
    a surface of the display is covered by a transparent panel, a deformation area of the transparent panel has a cylindrical curved surface, and an area on the display and corresponding to the deformation area of the transparent panel is a first area of the display; and
    the at least one processor is configured to:
        obtain an optical deformation parameter of the first area;
        convert, according to the optical deformation parameter of the first area, a shape of first image data to obtain second image data, wherein the first image data is image data to be displayed in the first area, and the first area of the display is used to display the second image data; and
        compensate the first area for luminance, including:
            extracting luminance channel data from the second image data;
            proportionally converting the luminance channel data in a change direction of the optical deformation parameter of the first area according to the optical deformation parameter; and
            restoring converted luminance channel data to the second image data.

2. The handheld electronic device according to claim 1, wherein the at least one processor is further configured to compress a length of the first image data in a change direction of the optical deformation parameter of the first area, according to the optical deformation parameter, to obtain the second image data.

3. The handheld electronic device according to claim 2, wherein the at least one processor is further configured to:
    divide the first image data into at least two subareas in the change direction of the optical deformation parameter of the first area, wherein areas obtained by mapping the at least two subareas onto the second image data have an equal width, and the width is a length in the change direction of the optical deformation parameter of the first area; and
    combine pixels in each subarea in the at least two subareas, according to weights of adjacent pixels, to obtain the second image data.

4. The handheld electronic device according to claim 2, wherein the at least one processor is further configured to:
    divide the first image data into at least two subareas in the change direction of the optical deformation parameter of the first area, wherein areas obtained by mapping the at least two subareas onto the second image data have an equal width, and the width is a length in the change direction of the optical deformation parameter of the first area; and
    combine pixels that have highest weights in corresponding subareas in the at least two subareas to obtain the second image data.

5. The handheld electronic device according to claim 2, wherein the at least one processor is further configured to:
    divide the first image data into at least two subareas in the change direction of the optical deformation parameter of the first area, wherein the at least two subareas have an equal width, areas obtained by mapping the at least two subareas onto the second image data have unequal widths, the widths of the areas obtained by mapping the subareas onto the second image data progressively increase in a direction of approaching a second area of the display, the second area of the display is an area whose optical deformation parameter is 1, and the width is a length in the change direction of the optical deformation parameter of the first area; and combine pixels in each subarea in the at least two subareas, according to weights of adjacent pixels, to obtain the second image data.

6. The handheld electronic device according to claim 1, wherein the handheld electronic device further comprises a backlight, and the backlight is disposed at a location corresponding to the first area; and the at least one processor is configured to compensate the first area for luminance according to the optical deformation parameter using the backlight.

7. The handheld electronic device according to claim 1, wherein the at least one processor is further configured to:

map the second image data to monochromatic channel data of combined image data; and combine the mapped monochromatic channel data of combined image data and another piece of monochromatic channel data of the combined image data to obtain the combined image data, wherein the first image data is the monochromatic image data, and the optical deformation parameter is an optical deformation parameter of monochromatic light corresponding to the first image data; and the display is configured to display the combined image data in the first area.

8. The handheld electronic device according to claim 1, wherein the handheld electronic device further comprises a front-facing camera, and the front-facing camera is configured to obtain a human face image;

the at least one processor is further configured to detect a relative angle between the human face and the display according to the human face image; and the at least one processor is further configured to obtain the optical deformation parameter of the first area of the display according to the relative angle between the human face and the display.

9. The handheld electronic device according to claim 1, wherein the optical deformation parameter is a ratio of a width of a pixel set displayed by the display to a width of a to-be-displayed pixel set, the pixel set comprises at least one pixel, and the pixel set is at a location in the first area; and the first area is an area that is on the display and whose optical deformation parameter is greater than 1.

10. A display method, wherein a display is covered by a transparent panel, a location on the transparent panel and corresponding to a first area of the display has a cylindrical curved surface, and the method comprises:

obtaining an optical deformation parameter of the first area of the display;

converting, according to the optical deformation parameter of the first area, a shape of first image data to obtain second image data, wherein the first image data is image data to be displayed in the first area;

compensating the first area for luminance, wherein the compensating the first area for luminance comprises:

extracting luminance channel data from the second image data;

proportionally converting the luminance channel data in a change direction of the optical deformation parameter of the first area according to the optical deformation parameter; and restoring converted luminance channel data to the second image data; and displaying the second image data in the first area.

11. The method according to claim 10, wherein the converting, according to the optical deformation parameter of the first area, a shape of first image data to obtain second image data comprises:

compressing a length of the first image data in a change direction of the optical deformation parameter of the first area, according to the optical deformation parameter, to obtain the second image data.

12. The method according to claim 11, wherein the compressing a length of the first image data in a change direction of the optical deformation parameter of the first area, according to the optical deformation parameter, to obtain the second image data comprises:

dividing the first image data into at least two subareas in the change direction of the optical deformation parameter of the first area, wherein areas obtained by mapping the at least two subareas onto the second image data have an equal width, and the width is a length in the change direction of the optical deformation parameter of the first area; and combining pixels in each subarea in the at least two subareas, according to weights of adjacent pixels, to obtain the second image data.

13. The method according to claim 11, wherein the compressing a length of the first image data in a change direction of the optical deformation parameter of the first area, according to the optical deformation parameter, to obtain the second image data comprises:

dividing the first image data into at least two subareas in the change direction of the optical deformation parameter of the first area, wherein areas obtained by mapping the at least two subareas onto the second image data have an equal width, and the width is a length in the change direction of the optical deformation parameter of the first area; and combining pixels that have highest weights in corresponding subareas in the at least two subareas to obtain the second image data.

14. The method according to claim 11, wherein the compressing a length of the first image data in a change direction of the optical deformation parameter of the first area, according to the optical deformation parameter, to obtain the second image data comprises:

dividing the first image data into at least two subareas in the change direction of the optical deformation parameter of the first area, wherein the at least two subareas have an equal width, areas obtained by mapping the at least two subareas onto the second image data have unequal widths, the widths of the areas obtained by mapping the subareas onto the second image data progressively increase in a direction of approaching a second area of the display, the second area of the display is an area whose optical deformation parameter is 1, and the width is a length in the change direction of the optical deformation parameter of the first area; and combining pixels in each subarea in the at least two subareas, according to weights of adjacent pixels, to obtain the second image data.

15. The method according to claim 10, wherein:

the first image data is monochromatic image data, and the optical deformation parameter is an optical deformation parameter of monochromatic light corresponding to the first image data; and the displaying the second image data in the first area comprises:
   mapping the second image data to monochromatic channel data of combined image data;
   combining the mapped monochromatic channel data of combined image data and another piece of monochromatic channel data of the combined image data to obtain the combined image data; and
   displaying the combined image data in the first area.

16. The method according to claim 10, wherein before the obtaining an optical deformation parameter of the first area of the display, the method further comprises:
   detecting a relative angle between a human face and the display; and
   the obtaining an optical deformation parameter of the first area of the display comprises:
      obtaining the optical deformation parameter of the first area of the display according to the relative angle between the human face and the display.

17. The method according to claim 10, wherein the optical deformation parameter is a ratio of a width of a pixel set displayed by the display to a width of a to-be-displayed pixel set, the pixel set comprises at least one pixel, and the pixel set is at a location in the first area; and
   the first area is an area that is on the display and whose optical deformation parameter is greater than 1.

* * * * *